United States Patent [19]

Young

[11] Patent Number: 5,299,307
[45] Date of Patent: Mar. 29, 1994

[54] CONTROLS FOR DRAWING IMAGES ON COMPUTER DISPLAYS

[75] Inventor: Craig S. Young, Zephyr Cove, Nev.

[73] Assignee: Claris Corporation, Santa Clara, Calif.

[21] Appl. No.: 568,983

[22] Filed: Aug. 17, 1990

[51] Int. Cl.⁵ .............................................. G06F 15/60
[52] U.S. Cl. ................................. 395/161; 395/155; 345/157; 345/163
[58] Field of Search ................ 364/518, 521, 522; 340/747, 750, 706, 710, 711, 709, 710; 395/133, 135, 141, 155, 161

[56] References Cited

U.S. PATENT DOCUMENTS

| | | | |
|---|---|---|---|
| 4,698,625 | 10/1987 | McCaskill et al. | 340/709 |
| 4,706,205 | 11/1987 | Akai et al. | 364/518 |
| 4,852,055 | 7/1989 | Lapeyre | 364/512 |
| 4,862,390 | 8/1989 | Weiner | 364/521 |
| 4,879,665 | 11/1989 | Akatsuka | 364/518 |
| 4,930,091 | 5/1990 | Schroeder et al. | 364/522 |
| 4,941,114 | 7/1990 | Shigyo et al. | 364/578 |
| 4,992,779 | 2/1991 | Sugino et al. | 340/712 |

Primary Examiner—Phu K. Nguyen
Attorney, Agent, or Firm—Blakely, Sokoloff, Taylor & Zafman

[57] ABSTRACT

A computer system provides a method and an apparatus for generating and manipulating graphic objects on a computer display screen. The computer aided design and drawing system includes a graphic guide used for associating edges and points of one graphic image with one or more other images. The graphic guide operates in relation to the position of a cursor on the computer display screen. After a first image has been drawn on the screen, the graphic guide automatically is initiated to assist the user in positioning and sizing a second and subsequent images that are drawn on the display screen. The computer system also includes a wall tool used for efficiently generating wall objects displayed on the display screen. Wall objects are generated and manipulated by specifying the width of the wall, displaying joints between walls, capping the ends of walls, and efficiently measuring the interior, exterior or center dimension of a wall. The present invention also includes a clean up tool used for manipulating and modifying the intersection, the joining, and the extension of graphic images displayed on the display screen. The clean up tool can be used to automatically remove interior line segments of objects, to remove desired portions of objects, or to automatically extend and join two objects.

25 Claims, 25 Drawing Sheets

CONTROLS FOR DRAWING IMAGES ON COMPUTER DISPLAYS

BACKGROUND OF THE INVENTION

1. Field of the Invention

This invention relates to the field of computer systems with display devices. Specifically, the field is that of interactive computer display control devices used for drawing and manipulating graphic or textual images on a display screen.

2. Prior Art

Interactive computer systems are commonly used for computer-aided design and drafting. These computer applications typically provide interactive controls for creating and manipulating graphic and textual images on a computer display screen. For example, a user operating one of these applications may be able to select from a plurality of drawing tools provided by the application. These drawing tools typically include controls for drawing images such as rectangles, polygons, circles, or blocks of text. A user may select a particular tool and position the associated image in a window on the display screen using a cursor control device, such as a mouse or a trackball. One such interactive computer display system is Claris CAD, developed jointly by Claris Incorporated, Santa Clara, Calif., and Craig S. Young d/b/a Computer Aided Systems for Engineering, Zephyr Cove, Nev.

A number of disadvantages exist with the image control mechanisms existing in the prior art. Some prior art computer assisted drawing mechanisms do not include a capability for associating dimensions between two images. This can be particularly troublesome when the two images are actually depictions of the same object as seen in different views. In this situation, the dimension of the sides or areas of one image correspond to the sides and areas of the other image. Thus, it is necessary that the dimensions of each image be accurately depicted. Since these prior art systems treat the images as independent entities, this accurate depiction is difficult to achieve. Moreover, a projection of points from one object onto another object is difficult to achieve in these prior art systems.

Another disadvantage of prior art computer-assisted design and drafting systems becomes apparent when images on the computer display screen are joined, overlaid, or extended. For example, a typical operation in a computer-assisted drafting application may be to draw two separate rectangular images. Part of one of these rectangles may overlay a portion of the other rectangle. The overlay portion may be represented in a number of ways. Typically, prior art computer-assisted drawing systems display overlaid images depending upon which image was created last. The most recently created image is usually displayed on the top layer. Thus, the edges of the top layered image are visible while portions of the edges of the overlaid image are hidden. Prior art systems provide little support for manipulating these overlaid and overlaying regions. Accordingly, there exists a need to provide an efficient, yet simple user interface for creating and manipulating a plurality of graphic images on a computer display screen.

As will be discussed below, the present invention provides an improved computer-assisted design and drawing system which overcomes the disadvantages of the prior art systems.

SUMMARY OF THE INVENTION

An improved computer-aided design and drawing system is disclosed. The improved system comprises an interactive computer controlled display system, including a bus for interconnecting system components, a processor, a random access memory, an optional read-only memory, a data storage means for storing data, a display device including a display screen, an alphanumeric input device, a cursor control device for interactively positioning a cursor on the display screen, and a signal generation device or mouse.

The computer-assisted design and drawing system disclosed herein includes a graphic guide used for associating edges and points of one graphic image with one or more other images. The graphic guide operates in relation to the position of the cursor on the computer display screen. After a first image has been drawn on the screen, the graphic guide automatically is initiated to assist the user in positioning and sizing the second and subsequent images that are drawn on the display screen. As the cursor is slowly moved horizontally or vertically across the screen for positioning a second image, the graphic guide automatically senses guide points on the corners, sides, mid-points and center of the first image and displays an orthogonal line extending through the guide point sensed from one edge of the display screen or window to the opposite edge. This guideline is displayed only so long as the cursor remains within a proximity region associated with the point sensed. As the cursor moves out of that proximity region, the guideline is removed from the display screen. If the cursor moves within the proximity region of two or more guide points, two or more guidelines will be displayed. If the cursor is moved quickly across the display screen, the graphic guide feature anticipates that the user does not require the guidelining capability; therefore, the guidelines are not displayed. The graphic guide feature is configurable using a separate menu provided for manipulating several parameters associated with the operation of the graphic guide. For example, the size of the proximity region in which the guidelines will be displayed is configurable in the configuration menu. The speed of the cursor associated with the operation of the graphic guide is also configurable in the configuration menu. Similarly, the number of guide points and the action relative to distance of the guide point from the cursor position is also configurable in the configuration menu.

The computer-assisted design and drawing tool of the present invention includes a means for drawing wall objects. Walls are graphic images comprising two parallel lines displayed a fixed distance apart. The wall object drawing means of the present invention includes means for automatically modifying the ends and joints of the object. The wall mechanism also includes a means for configuring the generation of wall objects.

The present invention includes means for manipulating the intersection, joints, and extensions of graphic images in the computer-assisted design and drawing environment. This capability is called the clean-up feature. The clean-up feature provides means for manipulating and altering the display of objects at particular position within the object. The clean-up feature can be used to repair the corners or joints, intersections or extension of objects displayed on the screen. In this way, a user is not required to explicitly define the image modifications required.

These and other features of the computer-assisted design and drawing system of the present invention are described herein. The means and methods of the present invention are described in more detail in the detailed description that follows.

DETAILED DESCRIPTION OF THE INVENTION

An improved computer-aided design and drawing system used for generating and manipulating graphic images on a computer display screen is disclosed. In the following description, specific displays, configurations, and methods are set forth in order to provide a through understanding of the present invention. However, it will be apparent to one skilled in the art that the present invention may be practiced without these specific details. In other instances, well known systems are shown in diagrammatical or block diagram from in order not to unnecessarily obscure the present invention.

Figure 1:
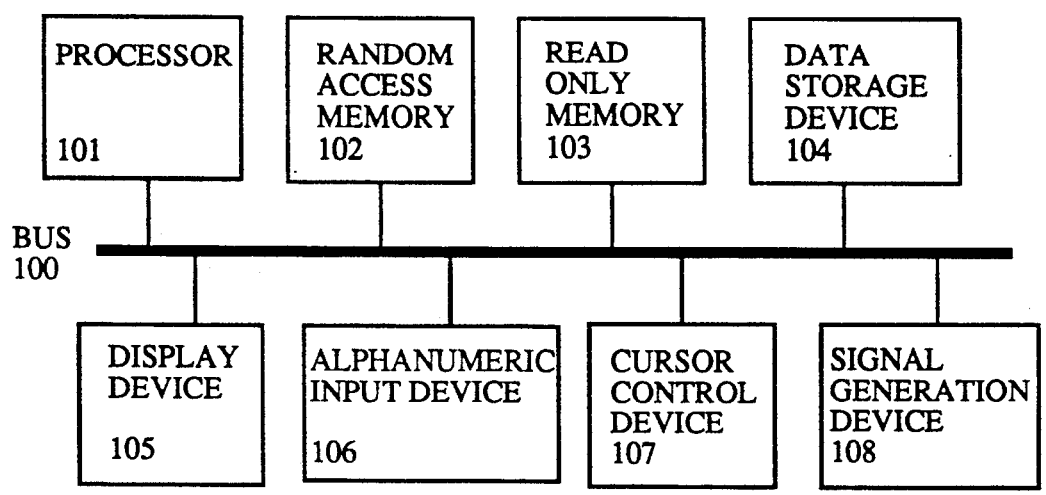
FIG. 1 is an illustration of the computer system architecture.

Referring now to FIG. 1, the computer system architecture of the preferred embodiment of the present invention is shown. This preferred embodiment is implemented on an Apple Macintosh ™ computer system, manufactured by Apple Computer, Inc., of Cupertino, Calif. It is apparent to one of ordinary skill in the art, however, that alternative systems may be employed. In general, such systems as illustrated by FIG. 1 comprise a bus 100 for communicating information, a processor 101 coupled with said bus 100 for processing information, a random access memory 102 coupled with said bus 100 for storing information and instructions for said processor 101, an optional read-only memory 103 coupled with said bus 100 for storing static information and instructions for said processor 101, a data storage device 104 such as a magnetic disk and disk drive coupled with said bus 100 for storing information and instructions, a display device 105 coupled to said bus 100 for displaying information to the computer user, an alphanumeric input device 106 including alphanumeric and function keys coupled to said bus 100 for communicating information and command selections to said processor 101, a cursor control device 107 coupled to said bus 100 for communicating information and command selections to said processor 101, and a signal generation device 108 coupled to said bus 100 for communicating command selections to said processor 101.

The display device 105 may be a liquid crystal device (LCD), cathode ray tube (CRT), or other suitable display device. The cursor control device 107 allows the computer user to dynamically signal the two dimensional movement of a visible symbol on the display screen of said display device 105. Many implementations of the cursor control device are known in the art, including trackball, mouse, joystick, or special keys on the alphanumeric input device 106 capable of signaling movement in a given direction.

The computer-assisted design and drawing system of the present invention provides additional controls and enhancements for these computer systems. These features of the present invention are described in the following sections. The general operation of the computer system or cursor control device is described only where necessary to provide a thorough understanding of the present invention, since these methods are well known to those of ordinary skill in the art.

Operation Of The Present Invention

Figure 2:
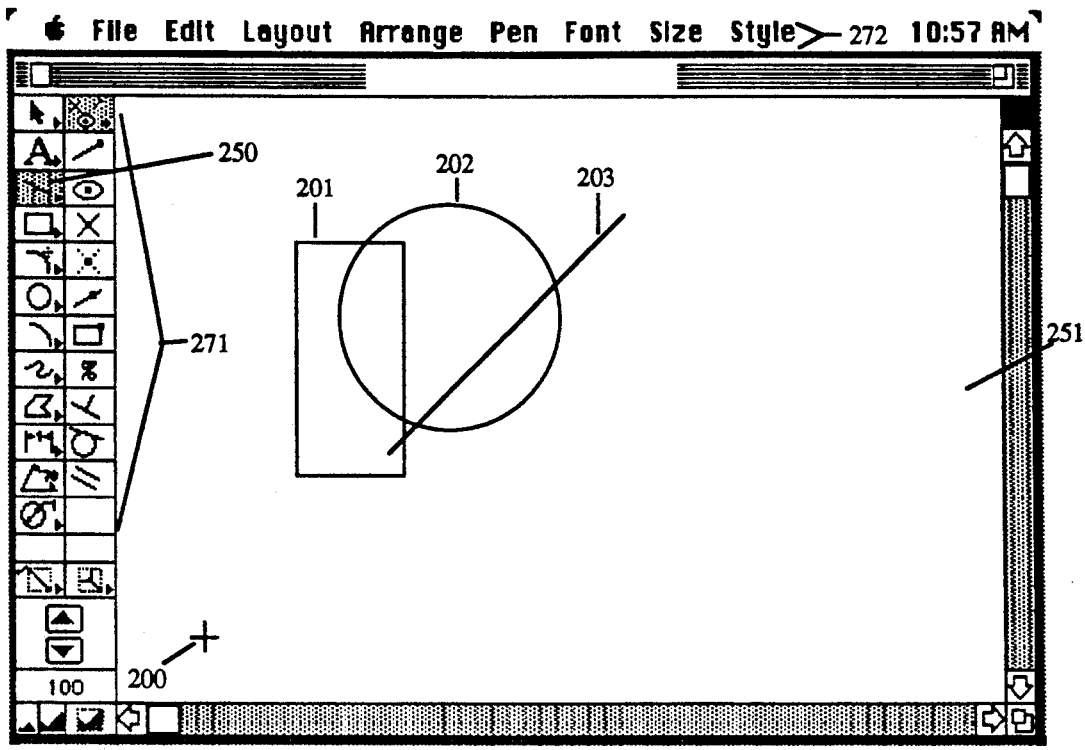
FIGS. 2-10 illustrate the graphic guide means of the present invention.

The computer assisted design and drawing system of the preferred embodiment provides an improved graphical user interface, with which a user may access and manipulate the features provided by the present invention. The graphical user interface is comprised of a window or windows and two columns of command selection regions. A window is typically a rectangular portion of a computer display screen in which information is displayed to a user. The information displayed may be in the form of textual, numerical, or graphical data. A window management system provides controls allowing a user to select the size and location of the window within the physical boundaries of the display. The command selection regions provide a means for selecting and activating the features of the present invention. Similarly, the graphical user interface in the preferred embodiment provides a row of menu selection items in a menu selection region at the top of the display screen. Individual menu items within the menu selection region may be selected using the cursor control device. A user may position a visible cursor on the display screen using the cursor control device. The cursor is placed within a region associated with the desired command selection or menu item while the signal generation device or mouse button is activated. When this occurs, the appropriate command selections can be made and appropriate responses can be generated. One well known system providing such a graphical user interface is the MacDraw system developed and distributed by Claris, Incorporated, Santa Clara, Calif. FIG. 2 illustrates the window, command selection regions and menu selection region of the graphical user interface of the preferred embodiment. The general operation of the graphical user interface is described only where necessary to provide a thorough understanding of the present invention, since these methods are known to those of ordinary skill in the art.

Referring now to FIG. 2, a means for activating the processes of the present invention is illustrated. Cursor 200 is shown as a visible symbol responsive to the movement of the cursor control device. Cursor 200 can be moved either horizontally or vertically anywhere on the display screen. The geometric shapes 201, 202, and 203 are independent graphical images drawn on the display screen using standard tools provided in the command selection region 271. The generation of these arbitrary shapes is a technique well known in the art. Once a shape is drawn, however, the present invention provides additional features for assisting the user in drawing other shapes. Referring again to FIG. 2, a user has selected a command or drawing tool 250, useful for generating a line segment on the display screen. Any of the other tools provided may equivalently have been selected by the user. The line tool 250 is shown selected only by way of example. Once drawing tool 250 has been selected, the user may move the cursor 200 anywhere on the display screen. Once drawing tool 250 or any other drawing tool is selected, the graphic guide feature of the present invention is automatically enabled (if so configured in the graphic guide configuration menu described below). No further command selections or activations are required of the user. As the user moves the cursor 200 freely around the display screen, the graphic guide feature of the present invention assists the operator, as will be described below.

Referring again to FIG. 2, cursor 200 is currently located at the lower left corner of the window 251. By way of illustration, subsequent figures will show the movement of the cursor 200 from its position in FIG. 2 in a direction toward the upper right corner of window 251. It will be apparent to those of ordinary skill in the art that cursor 200 may be moved arbitrarily in any horizontal or vertical direction.

As part of the present invention, graphical images drawn on the display screen can have guide points associated with the image. A guide point is a particularly useful reference point associated with a particular shape. For example, the guide points associated with a rectangular image comprise the four corners and the center of the rectangle. For a circular or oval shape, useful guide points might be orthogonal tangent points, the center of a circle, or points associated with a major and minor axis of an ellipse. Guide points associated with a line or vector shape might include the endpoints of a line segment and the mid point of the line segment. It will be apparent to those of ordinary skill in the art that other guide points associated with these shapes and other shapes might be selected for particularly useful reference points. For example, it may be useful to provide reference points on rectangular or line shapes representing the position ¼ of the way from one end of the line to the other end of the line, or ¼ of the way from one side of a rectangle to the other side of a rectangle. Similarly, other proportional guide point representations can be conceived. Information pertaining to guide points associated with each image generated on the display screen is stored in a guide point database. This guide point information includes the position of the guide point on the display screen.

Figure 1A:
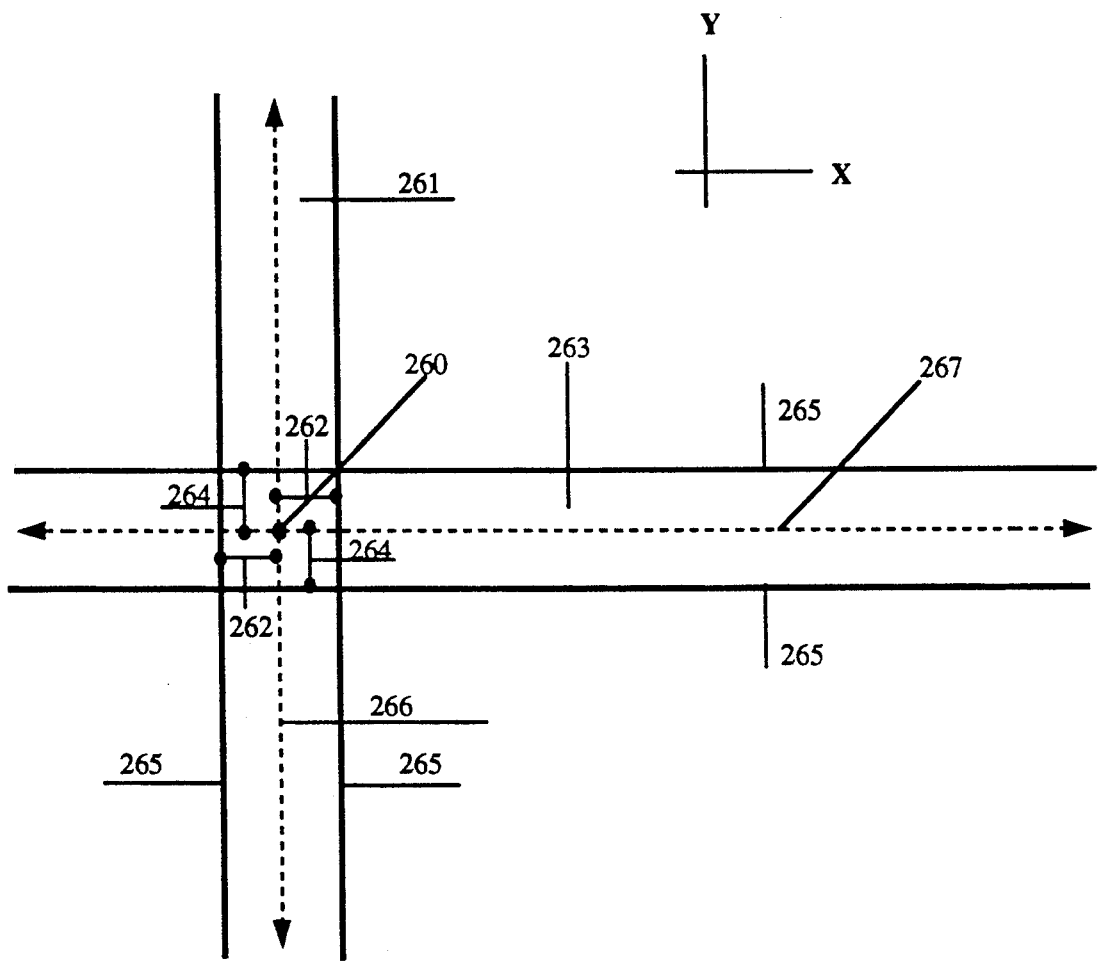
FIG. 1a is an illustration of proximity regions associated with guide points.

In the preferred embodiment of the present invention, every guide point has two associated proximity regions. A typical set of proximity regions is depicted in FIG. 1a. Referring to FIG. 1a, point 260 has two associated proximity regions, 261 and 263. The vertical proximity region 261 is defined by a distance 262 on the left hand and right hand sides of point 260. Thus, point 260 is centered in proximity region 261, which is defined by a horizontal dimension of twice the distance 262. The vertical dimension of proximity region 261 extends infinitely in the positive and negative Y directions, or alternatively, to the edge of the display screen or window in which point 260 is located. Thus, a proximity region 261 is defined for point 260.

The horizontal proximity region 263 is similarly defined. Point 260 is center-located within proximity region 263, defined by the vertical dimension of twice the distance 264. The horizontal dimension of proximity region 263 extends infinitely in the positive and negative X directions or to the edge of the display screen or window in which point 260 is located. Thus, each guide point maintained by the present invention has two proximity regions defined in the manner described. It will be apparent to those skilled in the art that other proximity regions associated with point 260 may equivalently be defined. For example, a region extending diagonally about point 260 may also be defined. Similarly, a circular region in which point 260 is the center of the region may also be defined as a proximity region. The preferred embodiment of the present invention, however, is described using only the two orthogonal proximity regions 261 and 263 described above.

Although these proximity regions logically exist for each guide point, no visual display representation of these regions is required. Thus, the outer boundaries 265 of the regions will not be visible on the display screen. In the preferred embodiment, lines 266 and 267 intersecting point 260 will be displayed, denoting the respective proximity regions 261 and 263.

Referring again to FIG. 2, cursor 200 is located as shown in the lower left hand corner of the window 251. Since cursor 200 is not located within the proximity region associated with any of the guide points for the existing images (the rectangle 201, the circle 202 and the line segment 203), there is no guideline currently visible in FIG. 2.

Figure 3:
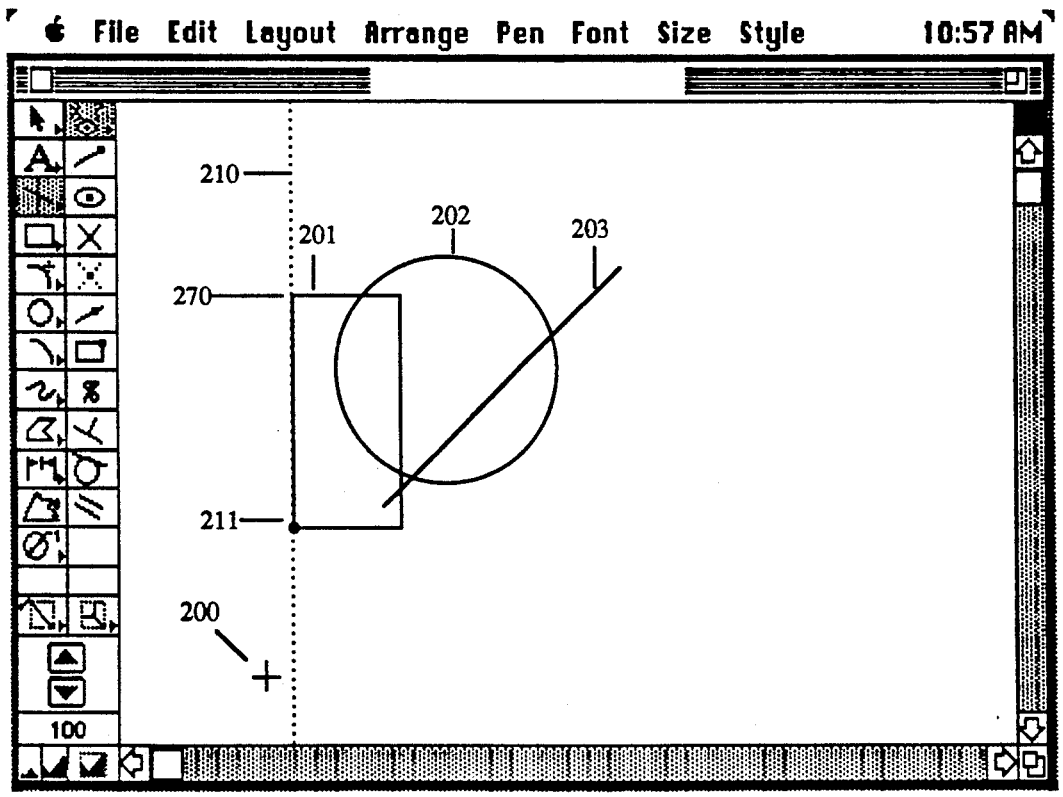

As cursor 200 is moved from its position in FIG. 2 to its position in FIG. 3, cursor 200 enters a proximity region associated with point 211. When this occurs, guideline 210 is displayed intersecting point 211 and extending to the edges of the window 251 in which point 211 is displayed. In addition, a small circle is displayed around point 211 indicating that point 211 is the guide point associated with the guideline 210. In this particular case, cursor 200 is also located within the proximity region associated with point 270. However, when two guide points have either the same X coordinate or Y coordinate, the present invention will select the guide point nearest the position of cursor 200.

Figure 4:
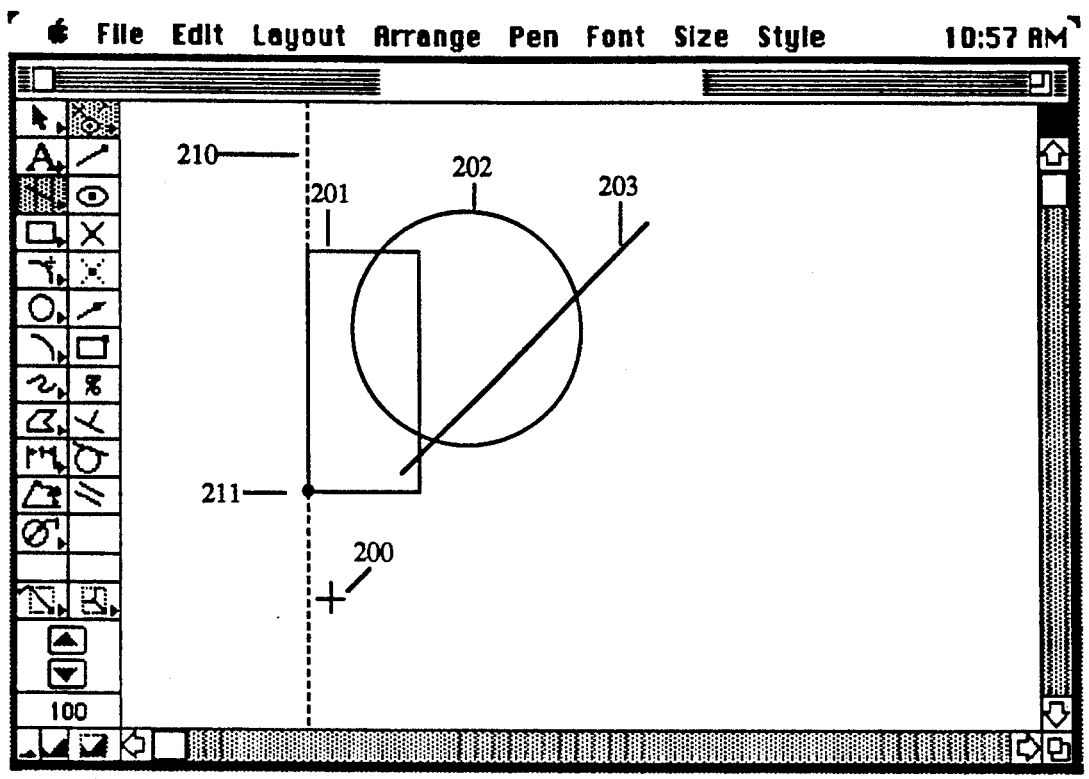

As cursor 200 is moved from its position in FIG. 3 to its position in FIG. 4, guideline 210 remains displayed, since cursor 200 is still within the proximity region associated with point 211. However, as cursor 200 moves from its position in FIG. 4 to its position in FIG. 5, cursor 200 moves from a position within the proximity region associated with point 211 to a position outside the proximity region for point 211. When this occurs, guideline 210 and the small circle displayed around point 211 are removed from the display screen. Thus, a guideline 210 for point 211 is displayed as long as cursor 200 is located within the proximity region associated with point 211.

Figure 5:
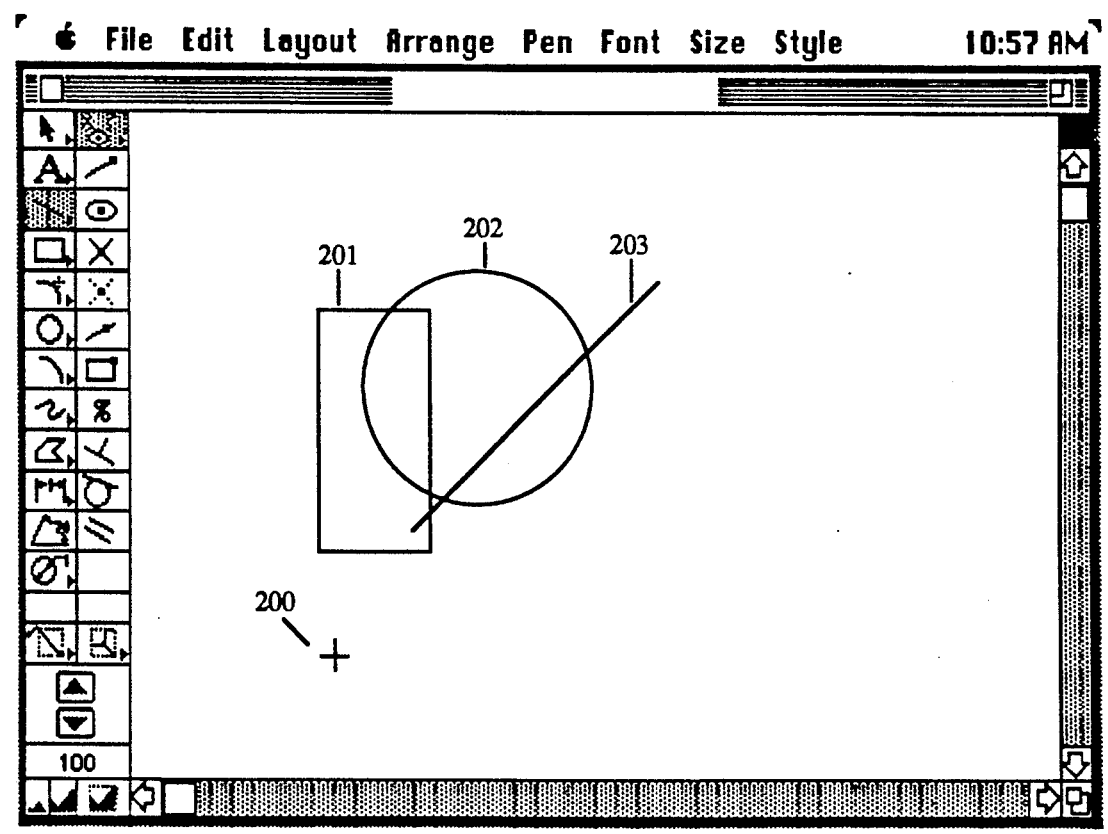
Figure 6:
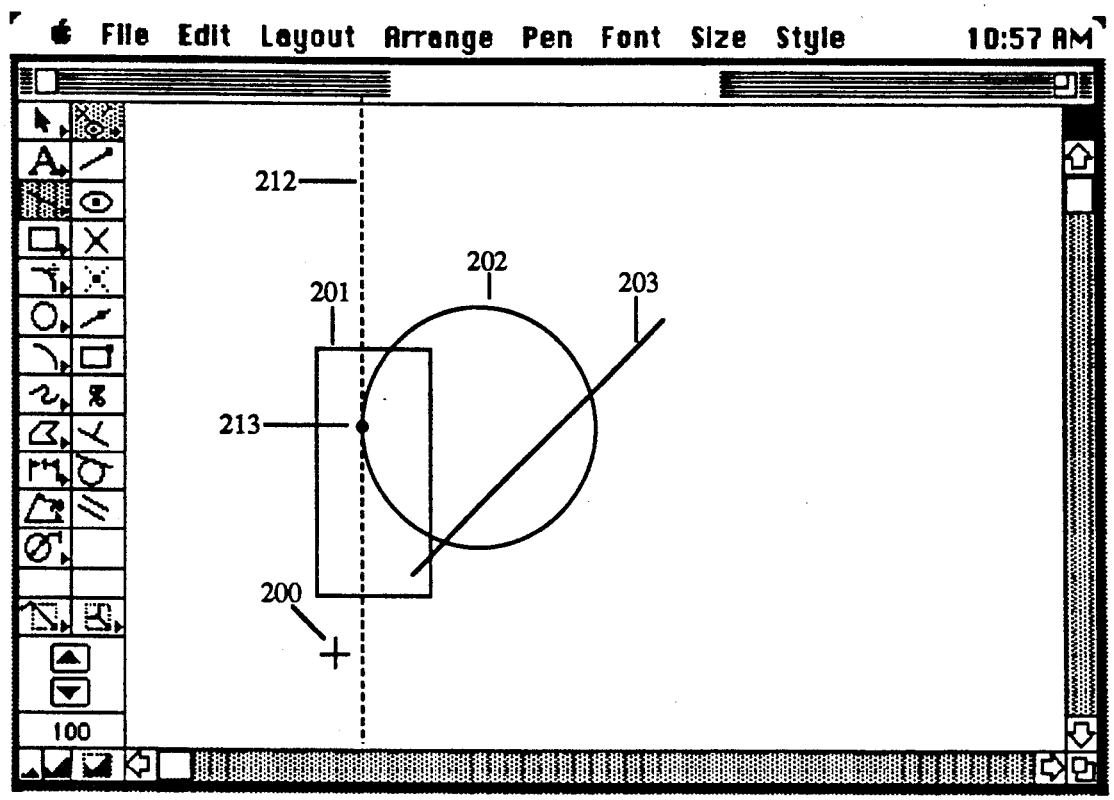

As cursor 200 is moved from its position in FIG. 5 to its position in FIG. 6, cursor 200 enters a new proximity region associated with point 213. Guide point 213 is a tangent point of circle 202. Guideline 212 and a small circle around guide point 213 is displayed while cursor 200 is located within the proximity region associated with point 213. Guideline 212 is depicted in FIG. 6.

Figure 7:
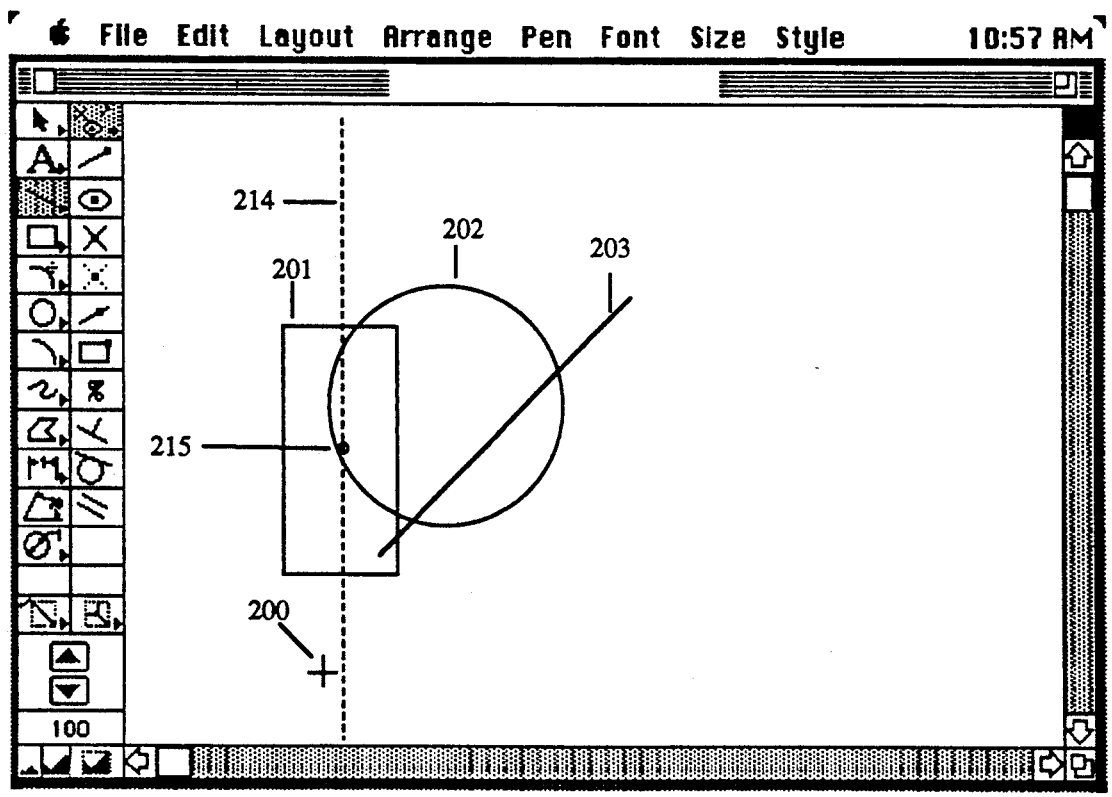

As cursor 200 is moved from its position in FIG. 6 to its position in FIG. 7, cursor 200 leaves the proximity region associated with point 213 and enters a proximity region associated with point 215. Guide point 215 is a point associated with the center of rectangle 201. As described earlier, guideline 214 and a small circle around guide point 215 is displayed when cursor 200 enters the associated proximity region. As cursor 200 is moved from its position in FIG. 7 to its position in FIG.

Figure 8:
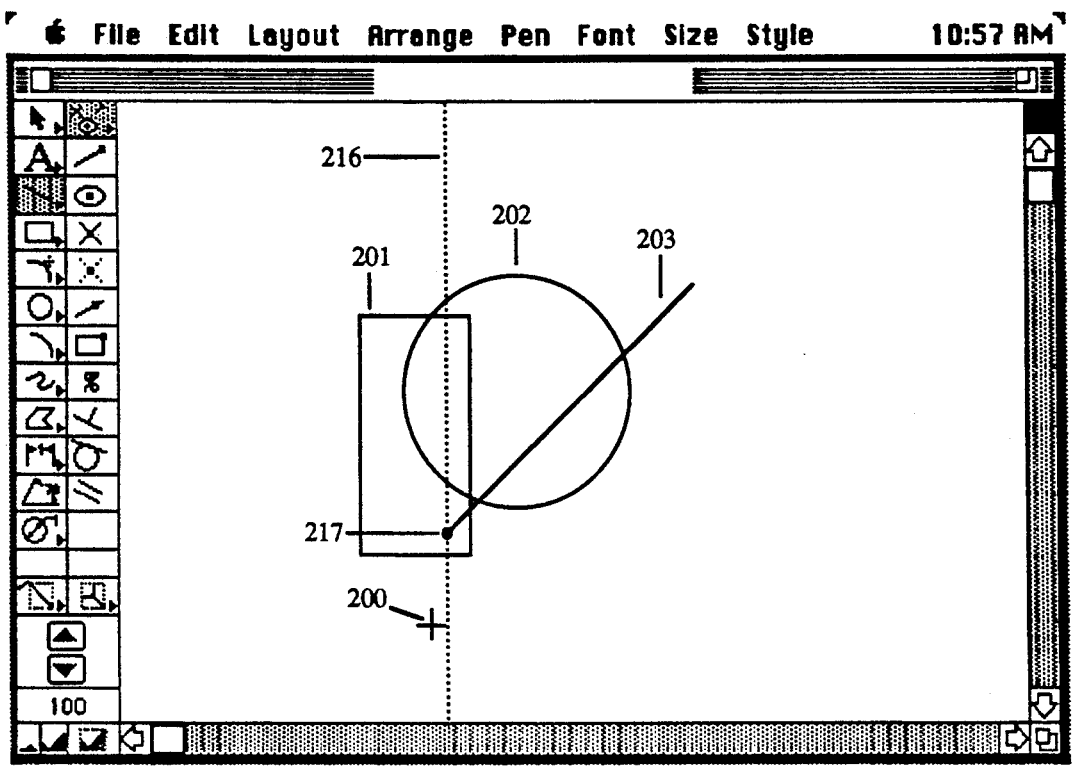

8, cursor 200 moves out of the proximity region associated with point 215 and enters a proximity region associated with point 217. Guide point 217 is an endpoint of line segment 203. Guideline 216 and a small circle around guide point 217 is displayed while cursor 200 is within the associated proximity region. As cursor 200 is moved from its position in FIG. 8 to its position in FIG. 9, cursor 200 becomes located within a proximity region associated with two guide points.

Figure 9:
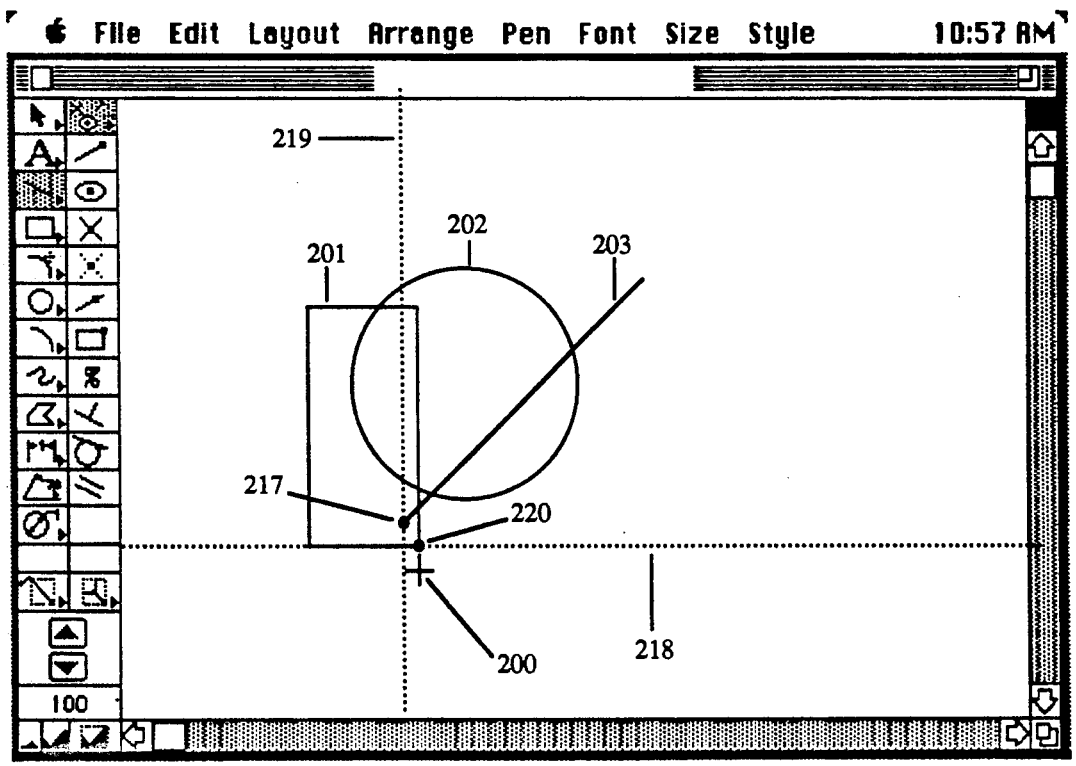
Figure 10:
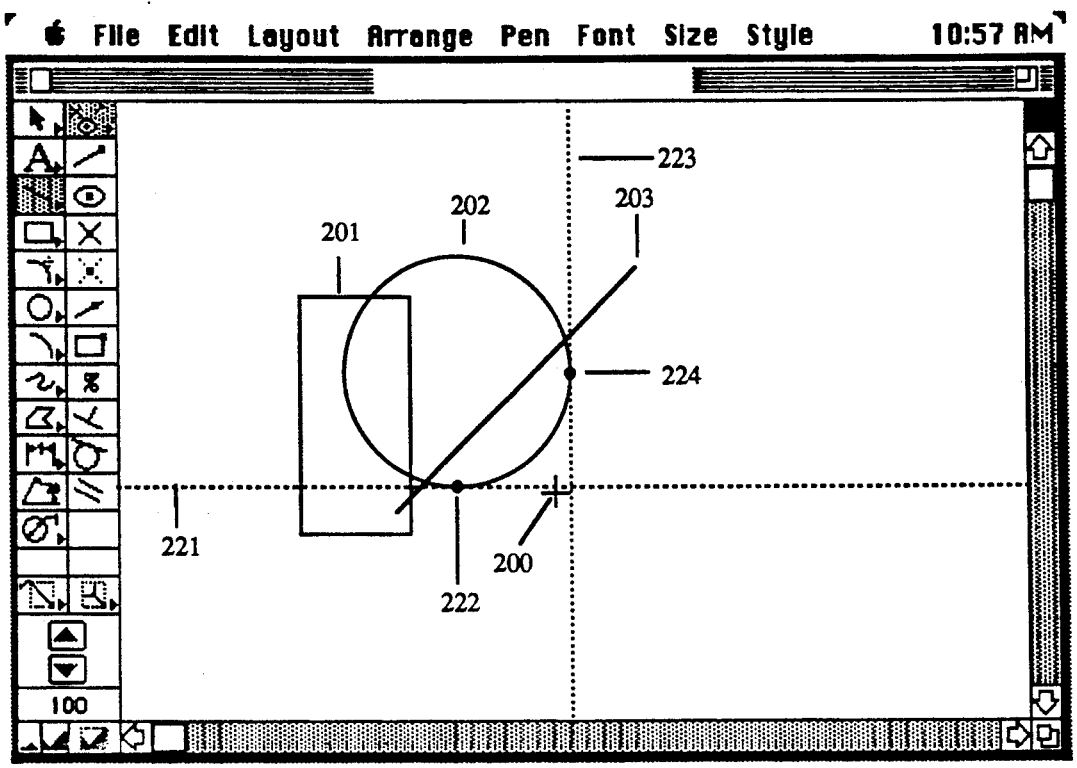

As depicted in FIG. 9, cursor 200 is located within the proximity region associated with guide point 217 and guide point 220. Guideline 218 is displayed as long as cursor 200 is located within the proximity region associated with guide point 220. Similarly, guideline 219 is displayed as long as cursor 200 is located within the proximity region associated with guide point 217. Thus, cursor 200 may be concurrently located within a plurality of proximity regions associated with any number of guide points. If this occurs, the present invention will display a plurality of guidelines associated with the proximity regions in which cursor 200 is located. A capability to display multiple guidelines in depicted in both FIGS. 9 and 10. In FIG. 10, cursor 200 has moved within a horizontal proximity region associated with guide point 222. Concurrently, guide point 200 has moved within a vertical proximity region associated with guide point 224. In this situation, the present invention simultaneously displays two guidelines 221 and 223 associated with guide points 222 and 224, respectively. Thus, a means for displaying guidelines associated with images displayed on a display screen is disclosed.

It will be apparent to those skilled in the art that variations in the actual display of the guidelines may be implemented without exceeding the scope and spirit of the present invention. It is also significant to note that the display of guidelines occurs automatically through no interaction by the user, other than simple movement of the cursor control device. Moreover, the present invention will enable or disable the automatic display of guidelines depending upon the speed at which the cursor 200 is moved. The present invention interprets slow movement of cursor 200 as a request for the display of guidelines. If cursor 200 is moved quickly across the screen, the display of guidelines is automatically disabled. In this way, a user can enable or disable the operation of guidelining without the need for activation of the signal generation device or a function key. The cursor speed threshold at which the graphic guide feature is enabled or disabled is user-configured using the configuration menu described next.

Figure 11:
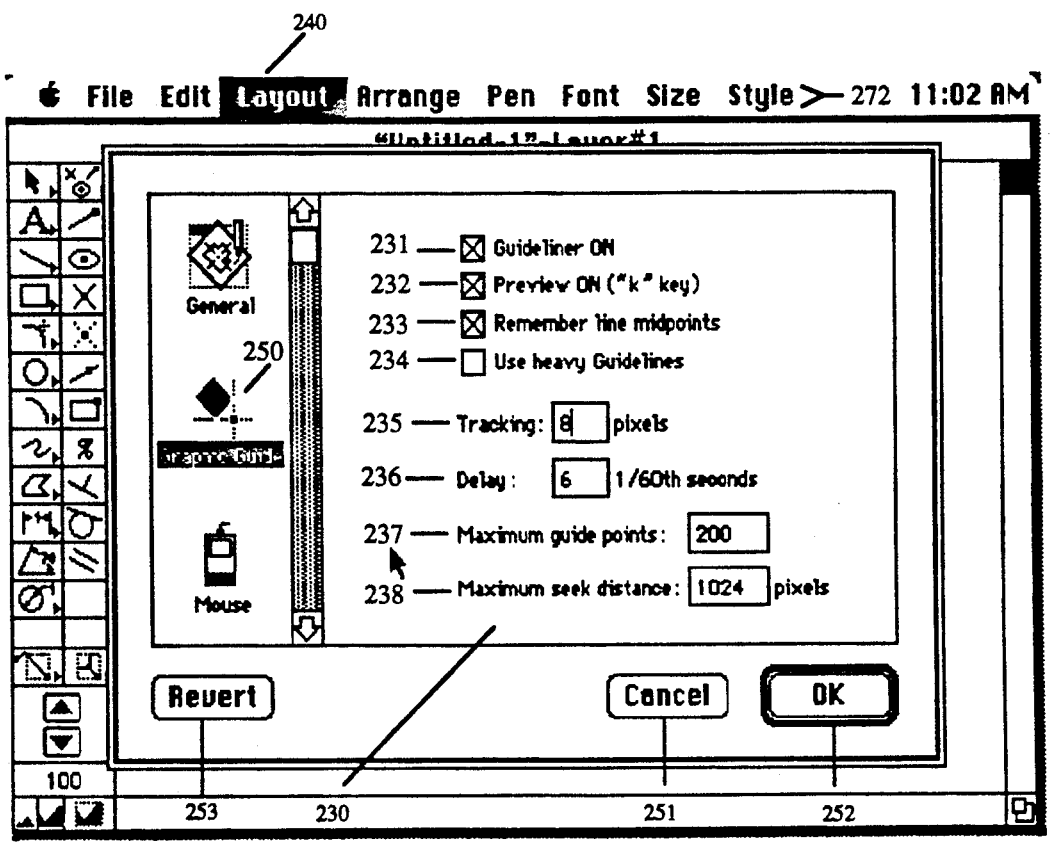
FIG. 11 illustrates the operation of the graphic guide configuration menu.

The graphic guide feature of the present invention provides an additional control means for configuring the operation of the graphic guide control means. Configuring the operation of the graphic guide is accomplished through a menu depicted in FIG. 11. In FIG. 11, the graphic guide configuration menu 230 is displayed upon selection by the user. Configuration menu 230 is selected after the user performs four selection steps. First, the user positions cursor 200 over the menu selection item labeled "Layout" 240. Secondly, the user activates the signal generation device or mouse button on the cursor control device. Third, cursor 200 is moved downward to another menu selection item labeled "Preferences". The signal generation device, or mouse button, is then released. Fourth, the user positions cursor 200 over the graphic guide icon 250 and activates the signal generation device or mouse button. This method of activating a particular menu is a well known technique known to those of ordinary skill in the art.

The control items provided in the configuration menu 230 provide a unique way of customizing and modifying the operation of the graphic guide control means. These control items are depicted in FIG. 11 and described below.

The first control item provided in configuration menu 230 is the graphic guide enable/disable control means 231. The guideliner enable/disable switch 231 provides a means for enabling or disabling the display of guidelines and guide points on the display screen. Guidelining can be either turned on or turned off by positioning cursor 200 within the small box displayed beside guideliner switch 231. Once cursor 200 is positioned within the box, the graphic guide control means can be enabled or disabled by the activation of the signal generation device or mouse button. Once activated, an "X" is displayed in the small box displayed beside guideliner switch 231. The next control item provided in configuration menu 230 is the "Preview On" switch 232. The preview switch 232 provides a function beyond the scope of the present invention.

The next control item provided in configuration menu 230 is the mid-point memory switch 233. This control item provides a capability for selectively retaining line mid-points in memory. If disabled, line mid-points are not used in the processing of guide points. This control item is selected using the selection box, as described above. The next control item is the guideline line type control item 234, used for specifying either light or heavy guidelines, as displayed on the display screen. This control item is again configured by using the selection box, as described above.

Four additional parameters are configurable in configuration menu 230. The first parameter is the tracking parameter 235. Tracking parameter 235 is used to specify the width or height of a proximity region associated with a guide point. Thus, guidelines can be displayed as cursor 200 moves within a selectively configurable number of pixels from a guide point. The desired number of pixels to be used for proximity tracking is entered into the box located adjacent to tracking parameter 235. The next configuration parameter in configuration menu 230 is the delay parameter 236. The delay parameter 236 is used to specify the speed of cursor movement beyond which automatic graphic guidelining is disabled. As described earlier, quick movement of the cursor control device will disable the automatic display of guidelining. Delay parameter 236 provides a means for configuring the cursor speed threshold. The next configuration item is the guide point limit parameter 237. This parameter provides a means for selectively configuring the number of guide points that can be concurrently used for referencing guidelines. The guide point limit parameter 237 provides a means for reducing the amount of display clutter on complicated diagrams. The next configuration parameter is the maximum seek distance parameter 238. This parameter provides a means for configuring the distance between cursor 200 position and the position of a guide point associated with an image. If this distance is beyond the maximum seek distance specified in maximum seek distance parameter 238, the associated guide point will not be processed for guidelining. This parameter also provides a means for limiting the amount of guidelining for a particular drawing and reducing the amount of display clutter on complicated diagrams. The maximum seek distance parameter 238 provides a means for limiting the number of guide points displayed from the graphic guide data base based on a guidepoint's distance from the cursor position.

Figure 18:
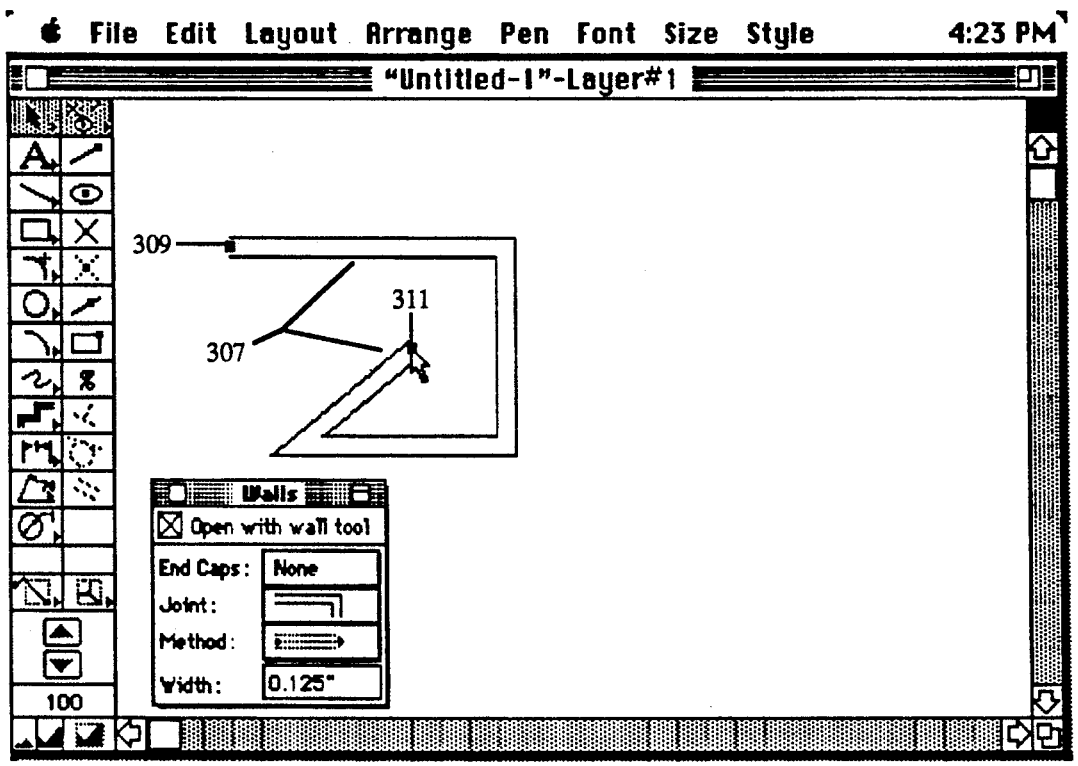
Figure 19:
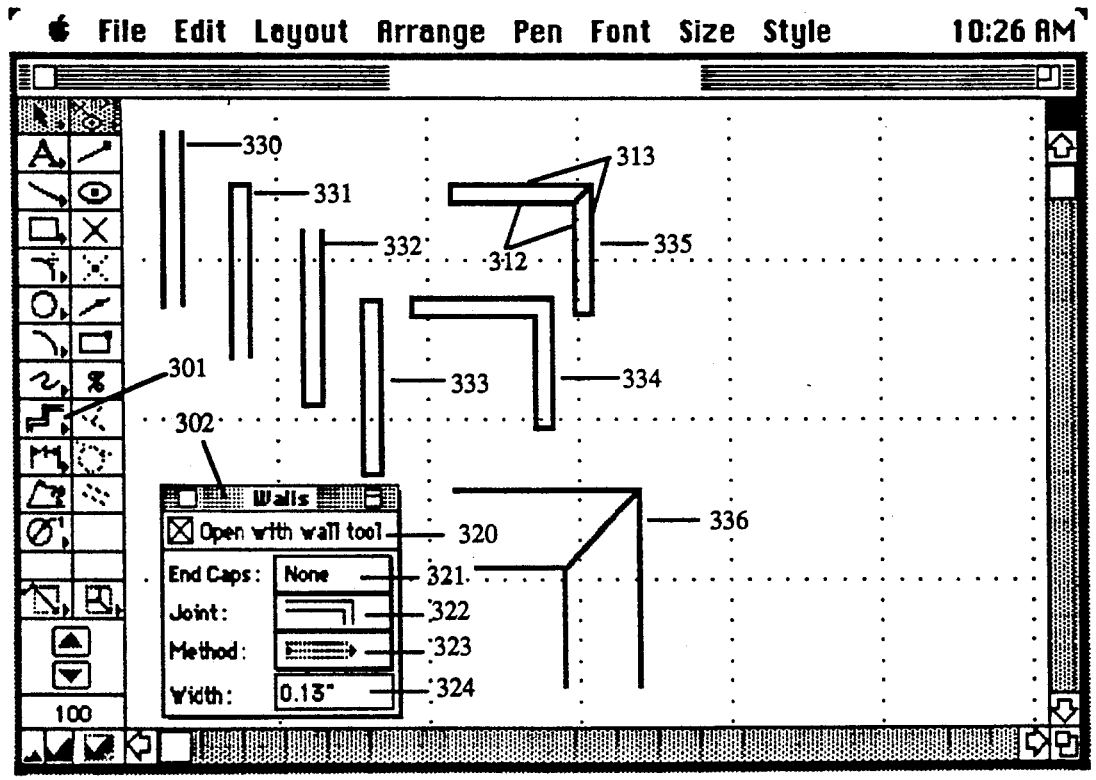
FIG. 19 illustrates the operation of the configuration window associated with the wall object tool.

In addition to the graphic guide feature, the present invention provides a means for generating and manipulating an object comprising two parallel lines capable of forming a polygon or any arbitrary shape. Such objects are referred to herein as walls or wall objects. Wall objects provide a convenient means for drawing diagrams requiring an image with two parallel lines such as architectural design drawings of buildings or other structures. Wall objects can be created in several segments each connected by common joints. A user is able to specify the number and position of the joints connecting wall segments. Joints are drawn in either a formed or mitered format. Joints are formed by connecting the interior edges of two wall segments to a common inner end point and connecting the exterior edges of the two wall segments to a different common outer end point. The joint is not displayed as overlapping regions. A mitered joint is displayed by connecting the common inner point to the common outer point with a diagonal line. Several examples of wall objects generated using the wall control means of the present invention are depicted in FIGS. 18 and 19.

Figure 12:
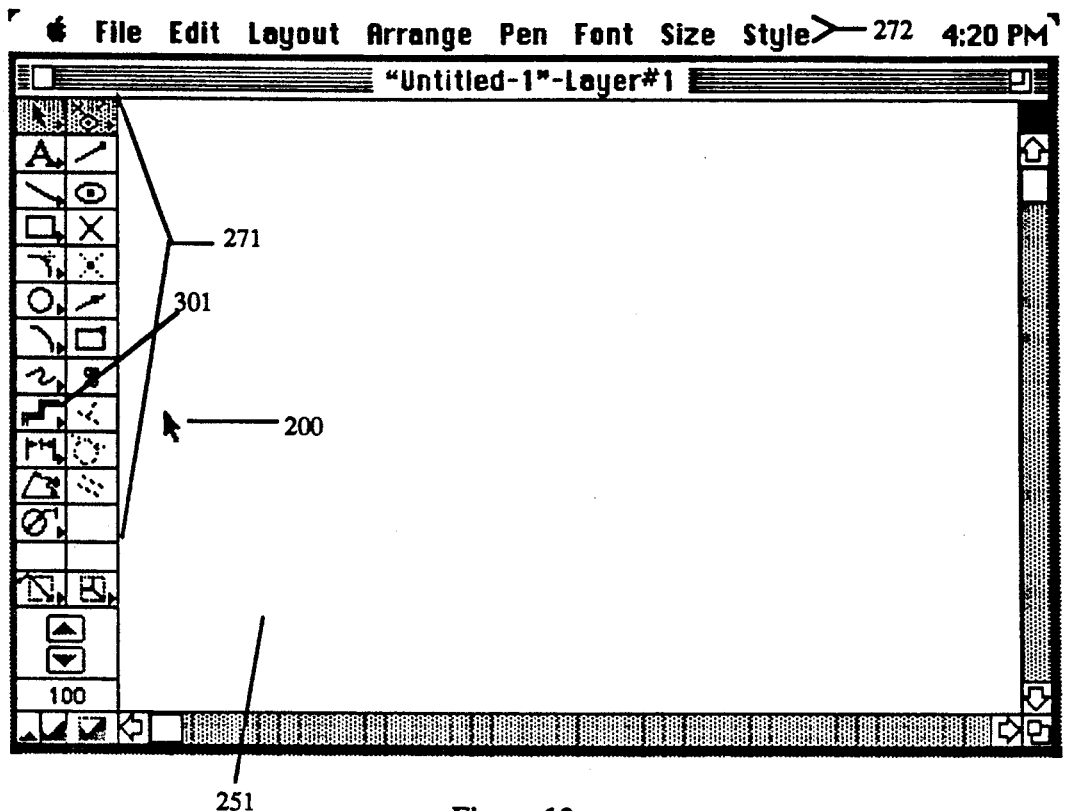
FIGS. 12-18 illustrate the operation of the wall object tool.

Referring to FIG. 12, a means for activating the wall control means or wall tool of the present invention is illustrated. As shown, a window 300 is depicted containing no images except for the cursor 200. Along the left hand border of the window 300 is a column of command selection items 271, indicated by small rectangular boxes. One such box 301 represents the wall tool of the present invention. The wall tool is selected by moving cursor 200 into wall tool command selection box 301. The signal generation device or mouse button is then activated. This action results in wall tool command selection box 301 being back-lighted and the wall tool being activated. This sequence for selecting one of several command tools provided by a drawing system is a technique well known in the art.

Figure 13:
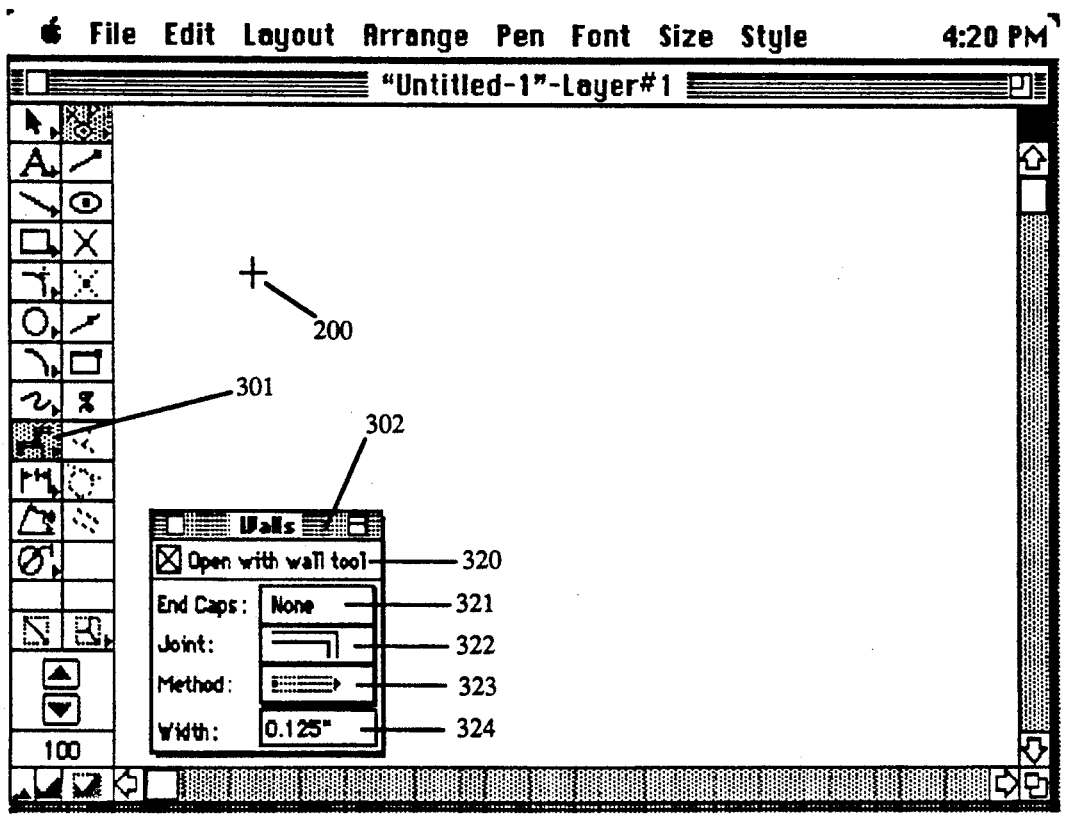

Once the wall tool is activated as described above, the operation of the present invention begins by displaying a wall configuration window 302, as depicted in FIG. 13. The symbol representing cursor 200 is also changed from an arrow to a crosshair cursor upon activation of the wall tool. The user is now able to move cursor 200 anywhere within the window 251 before positioning the first wall segment.

Figure 14:
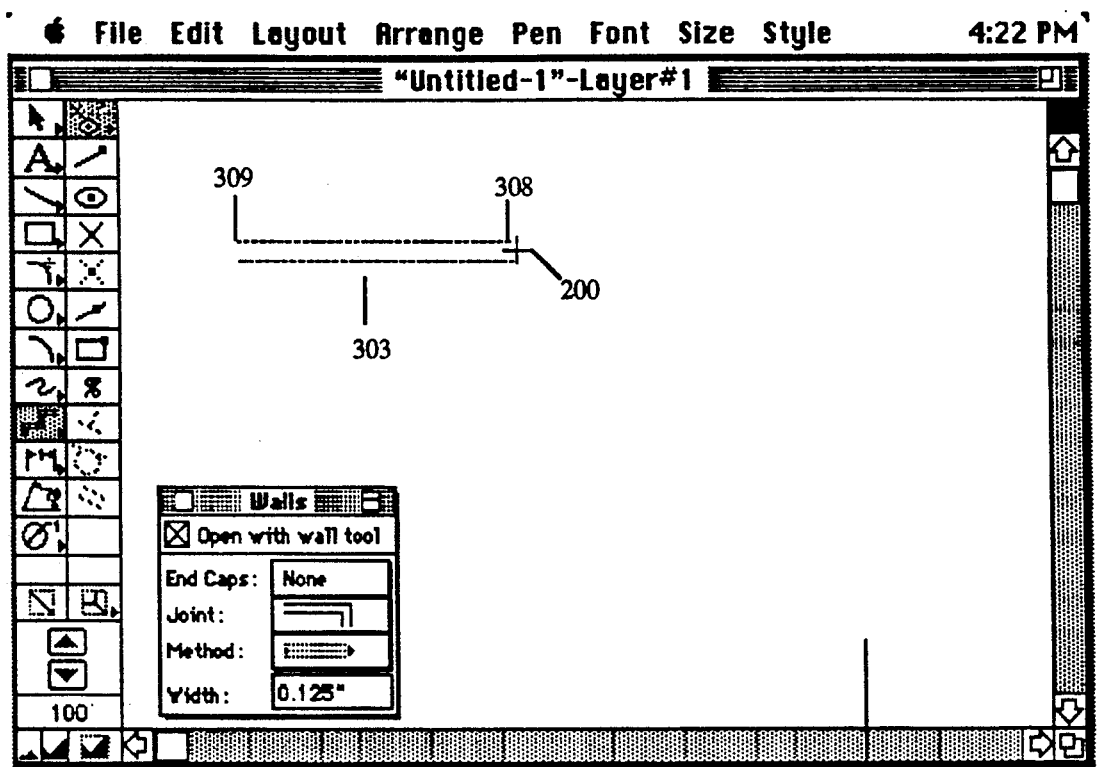

Referring to FIG. 14, the generation of the first wall segment is illustrated. Once the cursor 200 is moved to the desired starting position 309, the signal generation device or mouse button is activated. After activating the mouse button, the user may then move cursor 200 to a new position representing the end point 308 of the first segment 303 of the wall polygon. When cursor 200 is moved to the desired position of the end point 308 of wall segment 303, the signal generation device is again activated. The result of these actions is depicted in FIG. 14. As shown, two dotted line segments are displayed a configurable distance apart. A starting point 309 of both line segments is located at the position where the signal generation device was first activated. The end point 308 of both line segments is located at the position where the signal generation device was re-activated. The location of both end points is specified by the location of cursor 200 at the time the signal generation device is activated or re-activated. The parallel lines representing the wall segment 303 are both drawn together automatically. There is no need for a user to independently draw each line segment. The distance between the parallel line segments is configurable using the wall configuration window described below.

Figure 15:
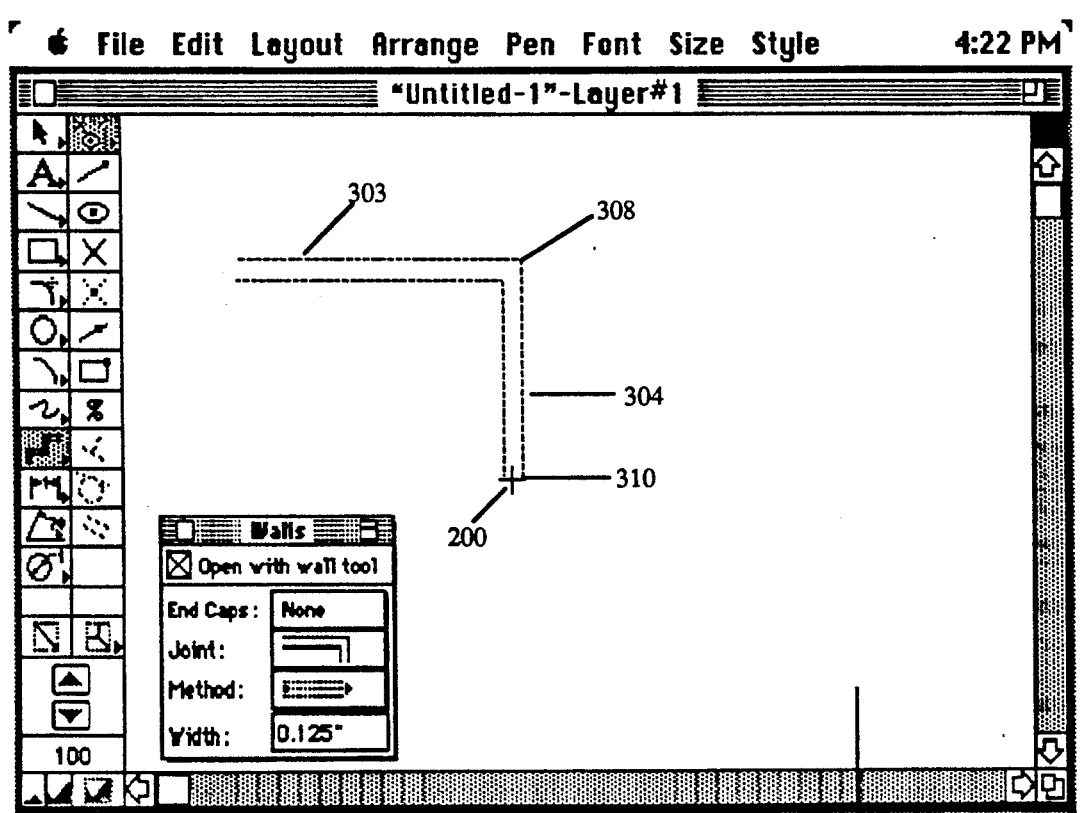
Figure 16:
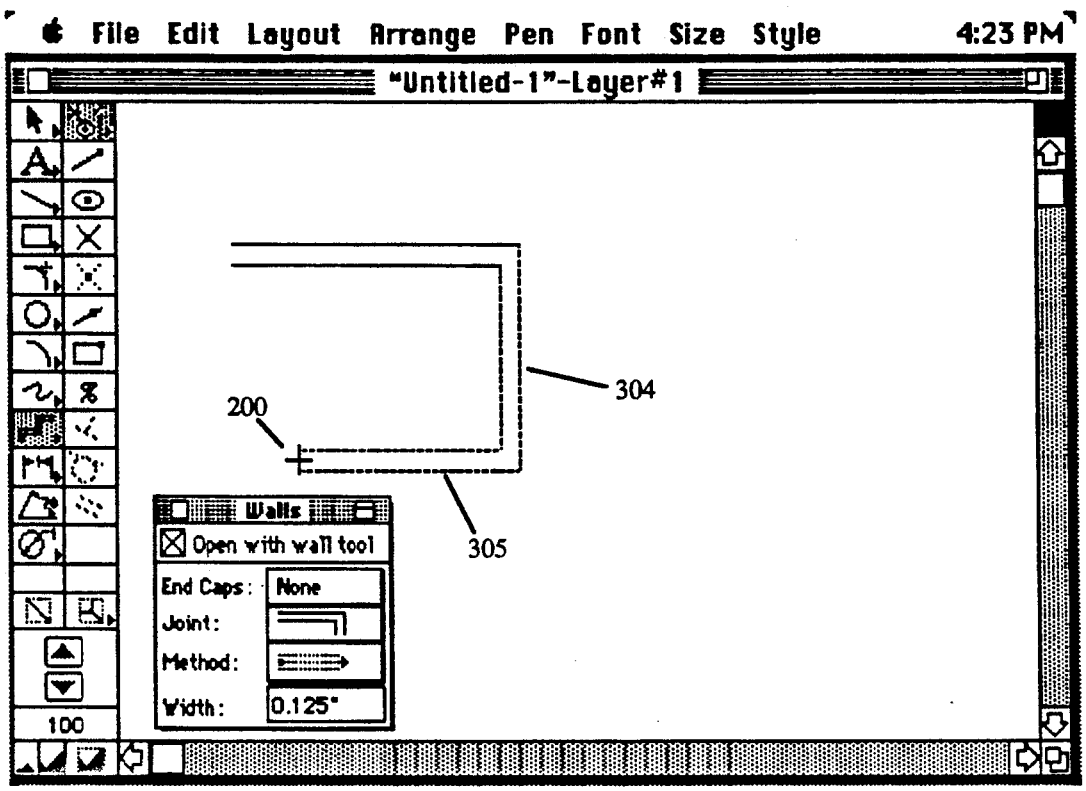
Figure 17:
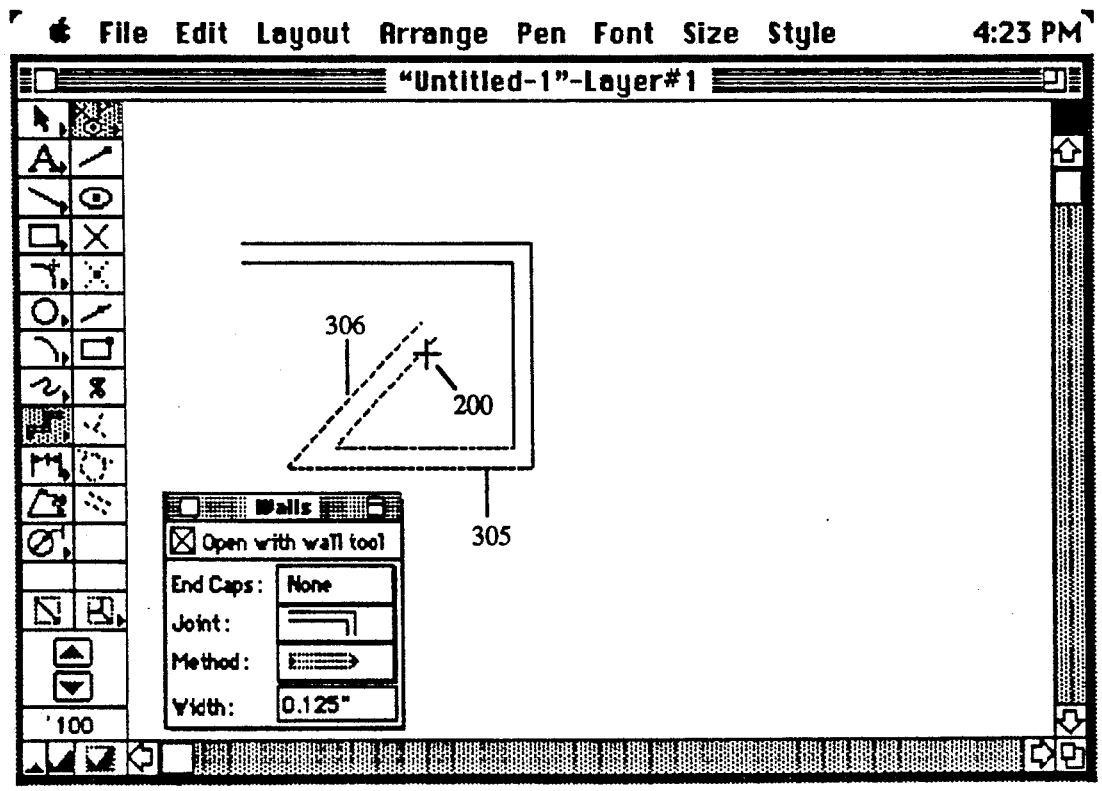

Referring again to FIG. 14, cursor 200 is located at an end point 308 of wall segment 303. This same cursor position also forms a starting point 308 for the second wall segment 304 of the wall polygon. The point 308 connecting the first wall segment 303 to second wall segment 304 is called a joint. When a joint has been positioned, cursor 200 may then be moved anywhere within window 251 to establish the next joint. Once the desired position is found, the signal generation device is again activated establishing the second end point 310 and joint of the second wall segment 304. Wall segments 303 and 304 are depicted in FIG. 15. Using the same technique described above to generate wall segments, wall segments 305 and 306 are generated, as depicted in FIG. 17. Once the desired wall object (collection of connected wall segments) is established, the signal generation device is activated twice in rapid succession, thereby terminating the generation of additional wall segments. Other means for terminating the generation of wall segments are available. For example, selecting the starting point of the wall or selecting a previously selected point may terminate the generation of new segments. When the generation of additional wall segments is terminated by any of the available means, a termination signal is generated.

Once a termination signal is received by the present invention, the wall object 307 thus created is displayed as in FIG. 18. If the wall tool had originally been selected with a single activation of the signal generation device while the cursor was within wall tool command selection box 301, only a single wall object is generated. In this case, the symbol displayed for cursor 200 is converted from a cross hair symbol to an arrow symbol, indicating that no further wall segments will be created. If the wall tool had originally been selected with a double activation of the signal generation device while the cursor was within wall tool command selection box 301, additional wall objects may be generated in the same manner described above. In addition, two small filled in squares are displayed at each end (309 and 311) of the wall object indicating that the wall object 307 is currently selected. When de-selected using the signal generation device, the two small filled in squares are removed leaving the display of the wall object 307. Thus, a means for generating a wall object comprising a plurality of wall segments joined at common end points is disclosed.

The wall drawing tool of the present invention also provides a configuration window used for customizing the operation of the wall control means. Referring to FIG. 19, the wall configuration window 302 is depicted. The wall configuration window 302 can be activated automatically upon selection of the wall tool command box 301. Alternatively, the wall configuration window 302 can be activated directly using a menu selection item. The initial activation of the wall configuration window 302 is controlled using selection item 320. By activating or de-activating the selection box in selection item 320, the initial activation of the wall configuration window 302 can be configured for automatic activation with the wall tool or manual activation with a menu selection item.

Four other parameters can also be configured using the wall configuration window 302. The first such parameter is the "End Caps" parameter 321. The "End Caps" parameter 321 provides a means for closing or capping the open ends of a wall object. Referring now to FIG. 19, wall object 330 is shown with both ends open. Using the end caps parameter 321, a user may specify that the starting end is capped only 331, or the terminating end is capped only 332, or alternatively, both ends are capped 333. The "End Caps" parameter 321 is configured by placing cursor 200 within the selection box associated with the "End Caps" parameter 321. The signal generation device or mouse button is then activated and cursor 200 is moved to the desired selection.

The second parameter provided by wall configuration window 302 is the "Joint" parameter 322. "Joint" parameter 322 provides a means for manipulating and modifying the corners or joints between two wall segments. Referring to FIG. 19, two wall objects 334 and 335 are shown. Each wall object (334 and 335) contains two wall segments connected at a corner joint. Using "Joint" parameter 322, a joint may be displayed with a diagonal line across the joint, as in wall object 335 or displayed as a formed joint without the diagonal line at the joint, as displayed in wall object 334. Either of these two selections may be made using joint parameter 322 by moving cursor 200 into the selection box adjacent to "Joint" parameter 322 and making the appropriate selections.

The third parameter provided in wall configuration window 302 is the "Method" parameter 323. "Method" parameter 323 is used to define the length of a wall segment as referenced from the interior edge, the exterior edge or the center of the wall. Any of these three selections can be made using the "Method" parameter 323.

The fourth parameter provided by the wall configuration window 302 is the "Width" parameter 324. This parameter is used to specify the distance between the interior and exterior edges of a wall segment. Referring to FIG. 19, wall object 336 contains wall segments wider than those depicted in wall object 334 and 335. The "Width" parameter 324 is used to create the different sizes of objects. The "Width" parameter 324 can be specified in terms of a fractional number of inches from one edge to the other.

It will be apparent to those skilled in the art that additional parameters may be provided in the wall configuration window 302. The wall configuration parameters shown in FIG. 19 are only provided by way illustrating the configurable nature of the wall tool of the present invention.

A third feature of the present invention is a means for manipulating and altering the display of objects at particular positions within an object. This capability is called the clean up feature. The clean up feature can be used to repair the corners, intersections, or extensions of objects displayed on the display screen. The clean up feature can be used to modify the intersections of any objects, except free hand shapes and splines. The clean up tool is particularly useful for wall objects.

Figure 20:
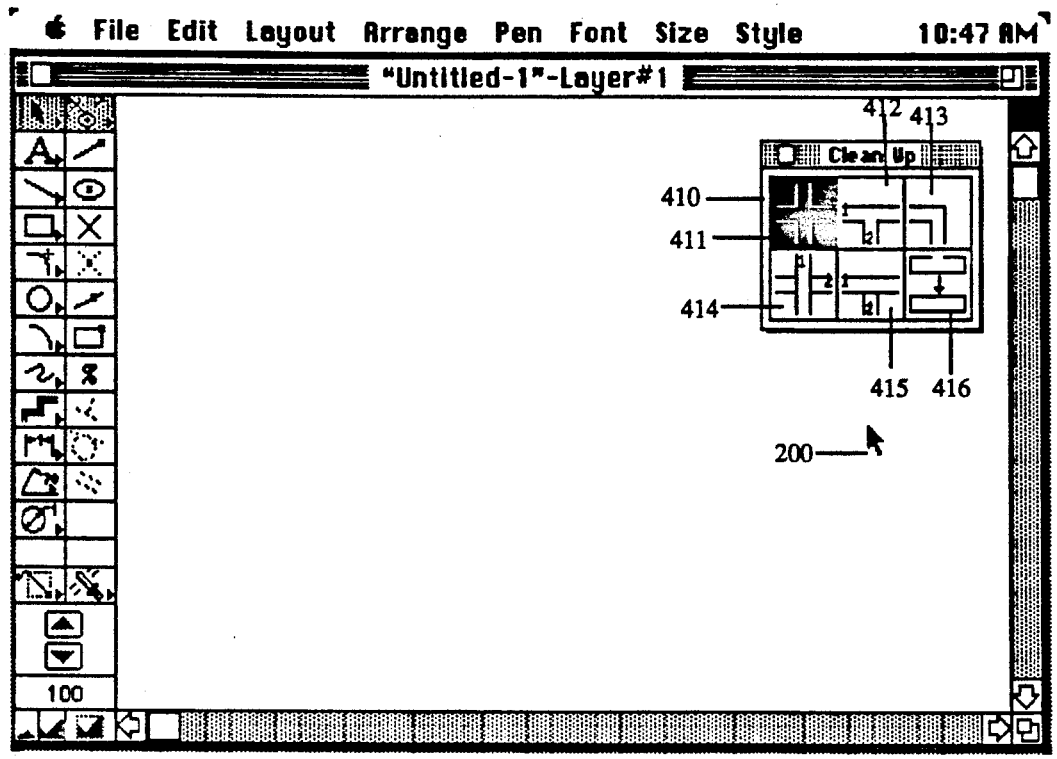
FIGS. 20-21 illustrate the operation of the clean up means used to modify graphic objects.

Referring to FIG. 20, a means for activating the clean up tool of the present invention is illustrated. The clean up tool comprises a plurality of clean up means, each used to modify displayed objects. The set of clean up means provided by the clean up tool of the present invention is coupled to a clean up window 410 displayed when the clean up tool is activated. The clean up tool is activated from a menu selection item identified using cursor 200 and the signal generation device. An alternate means for activating the clean up tool may be provided through the use of an appropriate alphanumeric keyboard command sequence. A means for selecting and activating the clean up tool is a technique well known in the art.

Figure 21:
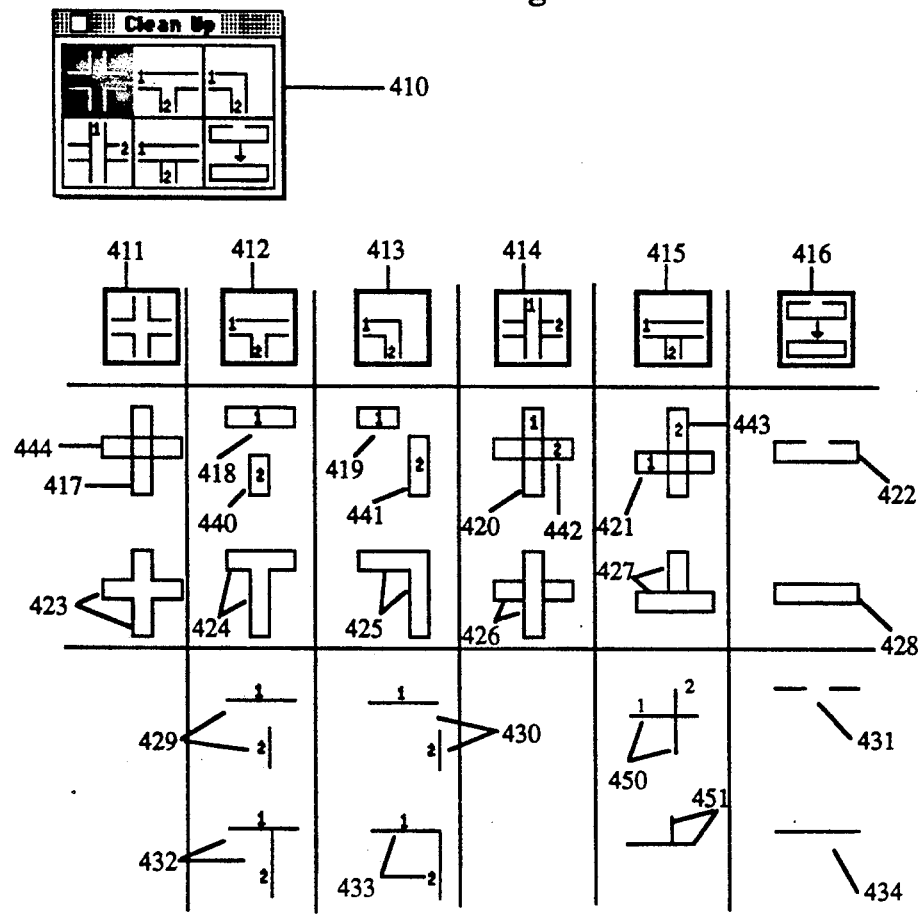

Once the clean up tool is activated as described above, the operation of the present invention begins by displaying a clean up selection window 410 as displayed in FIGS. 20 and 21. Clean up selection window 410 comprises six rectangular regions corresponding to six clean up means provided by the clean up tool of the present invention. Each of these six clean up means is depicted in FIG. 21.

Referring to FIG. 21, clean up means 411–416 are depicted. Clean up means 411 provides a method for modifying the intersecting region of two polygons or wall objects. Two such objects (417 and 444) are depicted prior to the activation of clean up means 411. In order to activate clean up means 411, a user positions cursor 200 within the rectangular region associated with clean up means 411. This rectangular region is located within clean up window 410. Once cursor 200 is positioned within the rectangular region associated with clean up means 411, the signal generation device or mouse button is activated to select clean up means 411. When this selection occurs, a visual indication is displayed indicating that clean up means 411 has been selected. In the preferred embodiment, the rectangular region associated with clean up means 411 is displayed in reverse video.

Once selection of clean up means 411 is complete, the user may release the signal generation device or mouse button and move cursor 200 anywhere on the display screen. With clean up means 411 selected, cursor 200 is moved within a polygon or wall object, such as the object 417 depicted in FIG. 21. The signal generation device is then activated. Next, cursor 200 is moved within another polygon or wall object, such as the object 444 also depicted in FIG. 21. The signal generation device is again activated. Upon selection of the second object, the clean up means 411 removes interior line segments in both objects 417 and 444 thereby producing the resulting objects 423.

In a similar manner, clean up means 412 can be activated to join two polygons, wall objects, or line segments. Referring again to FIG. 21, clean up means 412 is depicted including a rectangular region used for selecting the function. As described above, cursor 200 is positioned within the rectangular region associated with clean up means 412 and the signal generation device is activated. Once this occurs, the user may position cursor 200 on or within the first object that will be participating in the joining operation. As shown in FIG. 21, two polygon or wall objects 418 and 440 are depicted. Once clean up means 412 has been selected, as described above, cursor 200 is positioned within object 418, followed by the activation of the signal generation device. Next, cursor 200 is positioned within object 440, followed again by activation of the signal generation device. At the completion of the selection of the second object 440, the present invention will extend object 440 to meet object 418, thereby producing a joined object 424. Using a similar technique, two line segments 429 may be joined, thereby producing a joined object 432.

Clean up means 413 may be employed to join two polygon objects, two wall objects, or two line segments, thereby producing a corner. As depicted in FIG. 21, clean up means 413 is shown with an associated rectangle used for selecting the function. Once clean up means 413 is selected, as described above, cursor 200 may be moved on or within object 419, followed by the activation of the signal generation device. Cursor 200 is then moved on or within object 441, followed again by the activation of the signal generation device. Once this occurs, the present invention will extend objects 419 and 441 to meet at a corner, thereby producing object 425. Similarly, two line segments 430 may be joined using clean up means 413, thereby producing a joined line segment corner 433.

Referring again to FIG. 21, clean up means 414 is depicted. This clean up means provides another method for modifying the intersection between two polygon or wall objects. As described above, clean up means 414 is selected by positioning cursor 200 within the associated rectangular region and activating the signal generation device. Once this occurs, cursor 200 is then moved within the polygon object 420, followed by the activation of the signal generation device. Cursor 200 is then moved within the polygon 442 followed again by an activation of the signal generation device. Once this occurs, the interior line segments associated with object 442 are eliminated, thereby producing object 426, as depicted in FIG. 21. The operation of clean up means 414 has the effect of modifying two polygon objects in such as way that one polygon object appears to overlay another polygon object.

Again as illustrated in FIG. 21, clean up means 415 is shown. This clean up means is used to modify the intersection of two polygons, walls, or line segments. The objects are modified by removing a portion of one object extending beyond the limits of another object. As depicted in FIG. 21, clean up means 415 is activated by positioning cursor 200 within the rectangular region associated with clean up means 415 and activating the signal generation device. Once clean up means 415 is activated, cursor 200 may be moved within the polygon or wall object 421, followed by an activation of the signal generation device. Next, cursor 200 is moved within object 443, followed again by an activation of the signal generation device. Once this occurs, a portion of object 443 extending beyond object 421 is removed, thereby producing object 427. In a similar manner, two line segments 450 may be modified using clean up means 415, thereby producing a vector object 451.

The sixth clean up means 416 provided by the present invention is also depicted in FIG. 21. In the manner described above, clean up means 416 is selected using cursor 200 and the signal generation device. When clean up means 416 is activated, this function can be used to repair a polygon or wall object 422, or used to join two line segments 431. Once clean up means 416 is selected, as described above, cursor 200 is moved on or within object 422, followed by an activation of the signal generation device. When this occurs, any broken line segments associated with object 422 are replaced with solid line segments, thereby producing the object 428.

It will be apparent to those skilled in the art that additional clean up means may be provided for general or specialized applications. Any additional clean up means may be easily incorporated into window 410, thereby providing a single unified mechanism for activating any of the associated functions.

Processing Logic For The Present Invention

The present invention includes computer program logic for the operation of an improved computer aided design and drawing system. This logic is described in the following section and in FIGS. 22–34. In addition to the computer resources described earlier, the present invention operates in conjunction with an operating system and system functions capable of displaying windows, graphical and textual information within windows, and cursor symbols on the display device. System functions for interfacing with the cursor control device and cursor function keys are also required. These resources are standard processing components known in the computer art.

When the processor in the computer system of the present invention is first powered up, the operating system logic receives control and initializes the system components, such as random access memory 102, the display device 105, cursor control device 107, signal generation device 108, and data storage device 104. At the end of its initialization cycle, or in response to a user command, the operating system displays a window and menu similar to the display shown in FIG. 12. The program logic associated with the graphic guide function, the wall tool function, or the clean up function gets control when the appropriate command selection is made from the command selection region 271 or a menu selection is made from the menu 272, as described earlier. It is apparent to those skilled in the art that other means for activating the features of the present invention are available.

Figure 22:
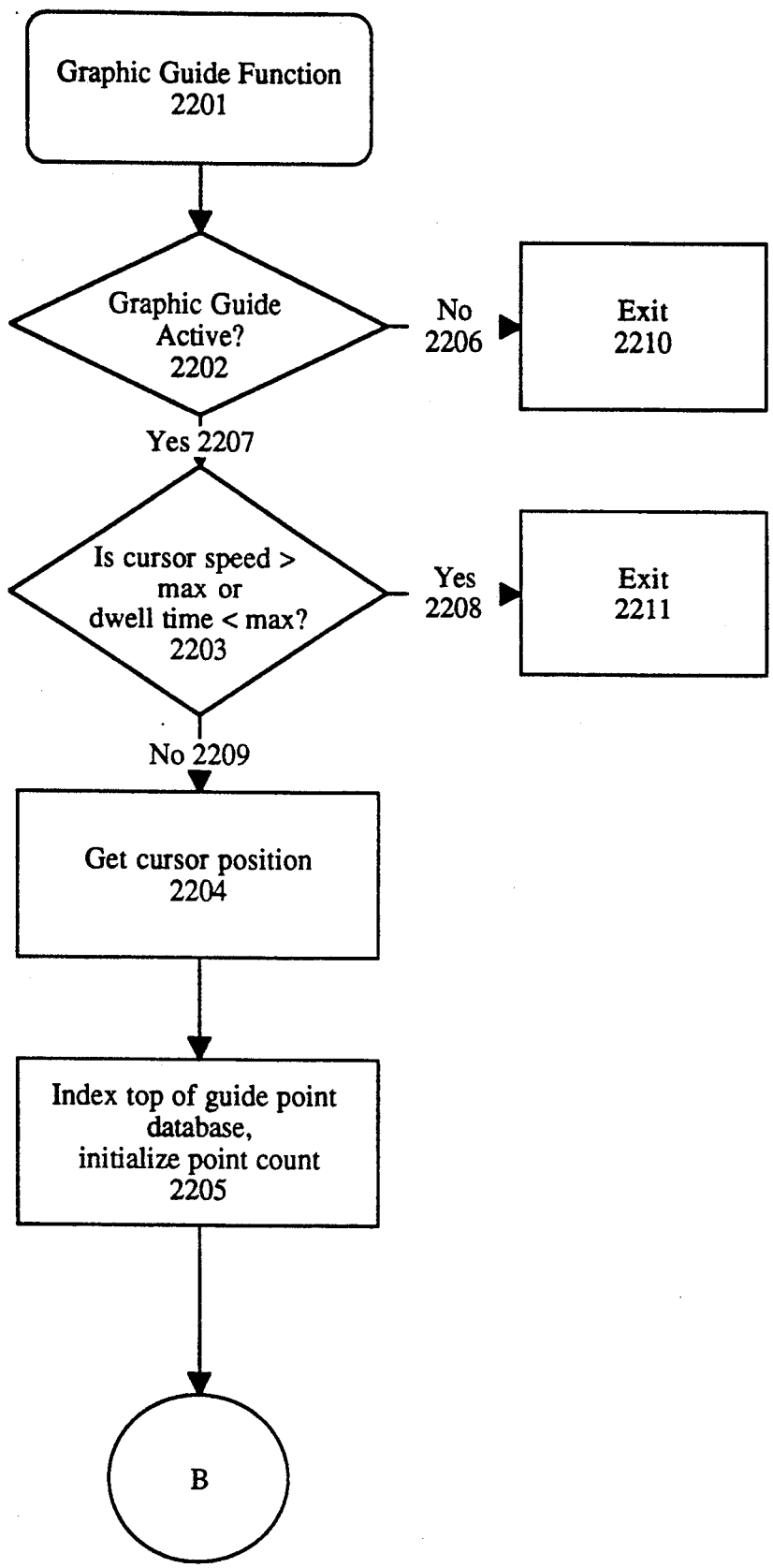
FIGS. 22-34 are flowcharts illustrating the processing logic of the present invention.

The graphic guide function is initiated automatically (if so configured) by the operating system once initialization is completed. When this occurs, the processing flow begins, as shown in FIG. 22 at the box labeled graphic guide function 2201. First, a test is performed 2202 to determine if the guide liner or graphic guide feature has been enabled using graphic guide configuration menu 230, shown in FIG. 11. As shown in FIG. 11, the graphic guide function may be enabled or disabled using selection option 231. Referring again to FIG. 22, if the graphic guide function is not enabled (processing path 2206), processing for the graphic guide function normally terminates at processing box 2210. If the graphic guide function is enabled (processing path 2207), processing continues to decision box 2203. A test 2203 is performed to determine if the cursor has remained within a predetermined region for a configurable length of time. This concept is denoted dwell time. In an alternative embodiment, cursor speed is compared to a maximum specified in the graphic guide configuration menu 230. If the dwell time is too short or the cursor speed is greater than the maximum allowed (processing path 2208), the graphic guide function is inhibited and processing terminates normally at processing box 2211. If the dwell time is longer than a preset threshold or the cursor speed is less than or equal to the maximum configured (processing path 2209), control flow continues to processing box 2204.

At this point in the processing flow, the graphic guide function is fully enabled and active. Since the operating system will activate this program logic whenever the cursor position changes, it is necessary to get the new cursor position (processing box 2204) through a call to an operating system function. In an equivalent embodiment, the operating system may provide the cursor position to the graphic guide processing logic when it is first initiated.

Once the current cursor position is obtained (processing box 2204), subsequent processing initiates a search of guide points as related to the current position of the cursor. This searching process begins by indexing the top of the guide point data base. The guide point data base contains all of the guide points associated with images currently drawn or active on the display screen. The guide point data base is updated when graphical objects are added, modified or deleted from the display screen. Also performed in processing box 2205 is the initialization of a guide point counter. The guide point counter is used to limit the number of guide points processed to a quantity within a maximum number of guide points specified in the graphic guide configuration menu 230. Once the searching process is initialized (processing box 2205), processing continues at the connector symbol labeled "B" in FIG. 23.

Figure 23:
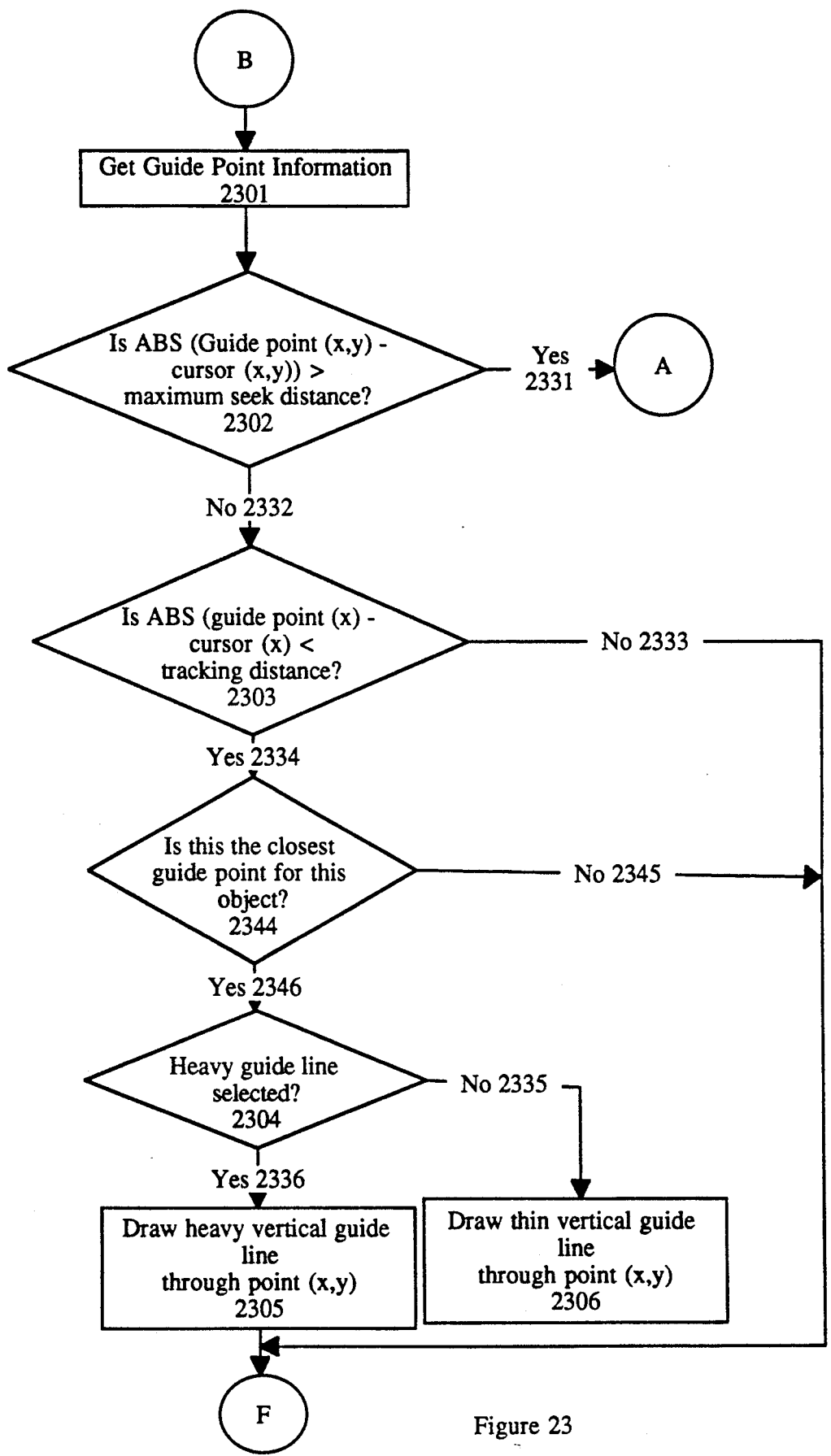

Starting at B in FIG. 23, information associated with the guide point currently indexed is retrieved from the guide point data base (processing box 2301). Next, a test is performed (decision box 2302) to determine if the current guide point is within the maximum seek distance of the current cursor position. If this is not true (decision path 2331), processing continues at connector symbol "A" in FIG. 25. If the currently indexed guide point is within the maximum seek distance of the cursor position (processing path 2332), another test is performed (2303) to determine if the current guide point x position is within the tracking distance of the current cursor x position. If this is not the case (processing path 2333), control drops to decision box 2307 where the y component of the guide point and cursor position is checked. If the x position of the current guide point is within the tracking distance (processing path 2334), another test is performed (decision box 2344) to determine if this guide point is the closest guide point to the cursor for the associated object. If this guide point is not the closest point (processing path 2345), control drops again to decision box 2307. If this guide point is the closest point (processing path 2346), another test is performed (decision box 2304) to determine if a heavy guide line has been chosen in graphic guide configuration menu 230. If a heavy guide line has been selected (processing path 2336), a heavy vertical guide line is drawn through the current guide point x, y position and extending from the top of the current display window to the bottom (processing box 2305). If heavy guide lines have not been selected (processing path 2335), then a thin vertical guide line is drawn through the current guide point x, y position from the top of the window to the bottom of the window (processing box 2306). Processing continues at connector symbol "F" in FIG. 24.

Figure 24:
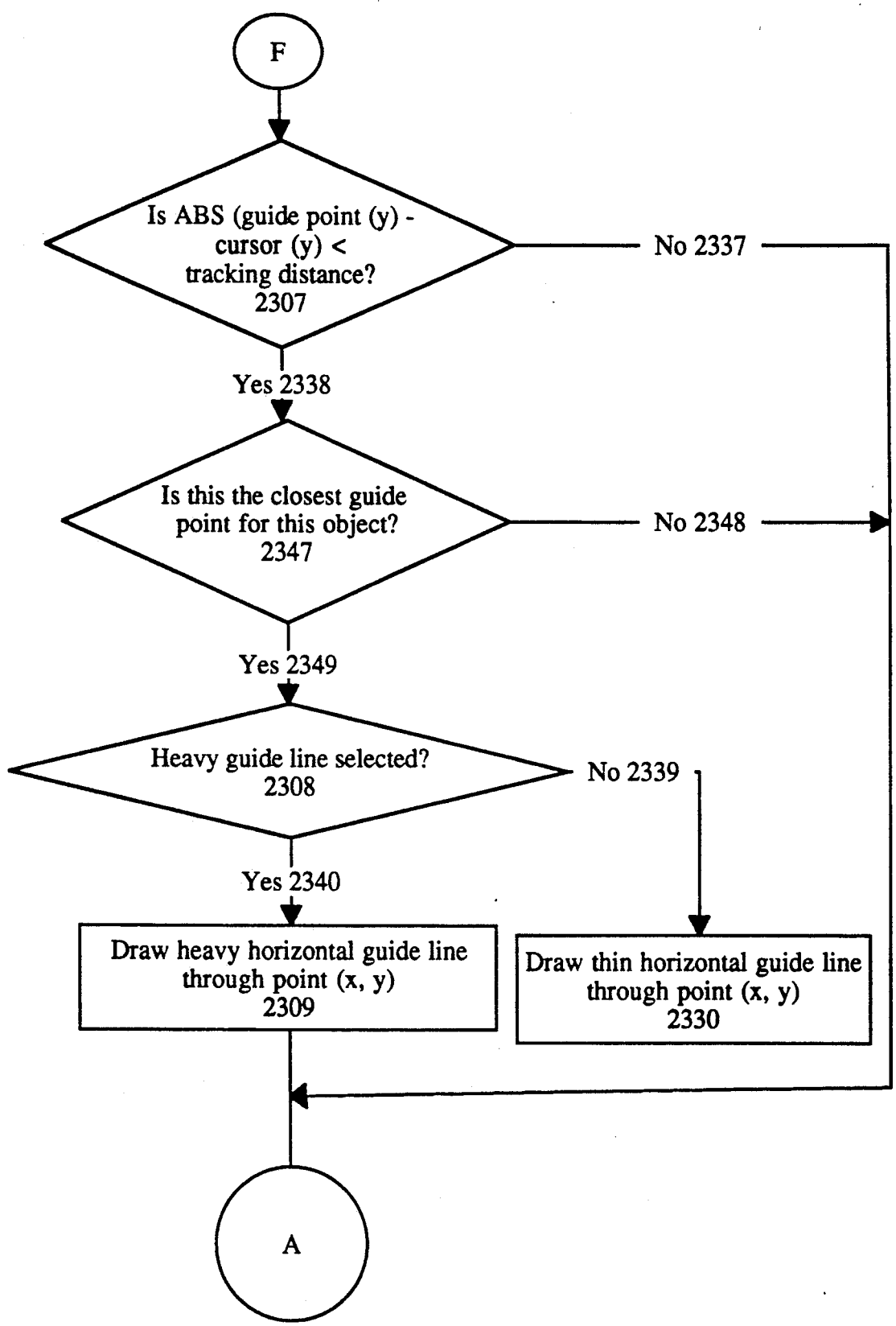

Starting at F in FIG. 24, the horizontal guide line is processed for the current guide point. A test is performed to determine if the current guide point y position is within the tracking distance of the current cursor y position (decision box 2307). If this is not the case (processing path 2337), control drops to connector symbol "A" in FIG. 25. If the guide point y position is within the tracking distance of the cursor y position (processing path 2338), another test is performed (decision box 2347) to determine if this guide point is the closest guide point to the cursor for the associated object. If this guide point is not the closest point (processing path 2348), control drops again to connector symbol "A". If this guide point is the closest point (processing path 2349), control drops to decision box 2308 where the selection of heavy guide lines is checked. If heavy guide lines have been selected (processing path 2340), a heavy horizontal guide line is drawn through the current guide point x, y position extending from the left hand edge of the display window to the right hand edge (processing box 2309). If heavy guide lines have not been selected (processing path 2339), a thin horizontal guide line is drawn through the current guide point x, y position extending from the left hand to the right hand edge of the display window (processing box 2330). Thus, having processed the horizontal and vertical guide lines for the currently indexed guide point, control drops to connector symbol "A" starting in FIG. 25.

Figure 25:
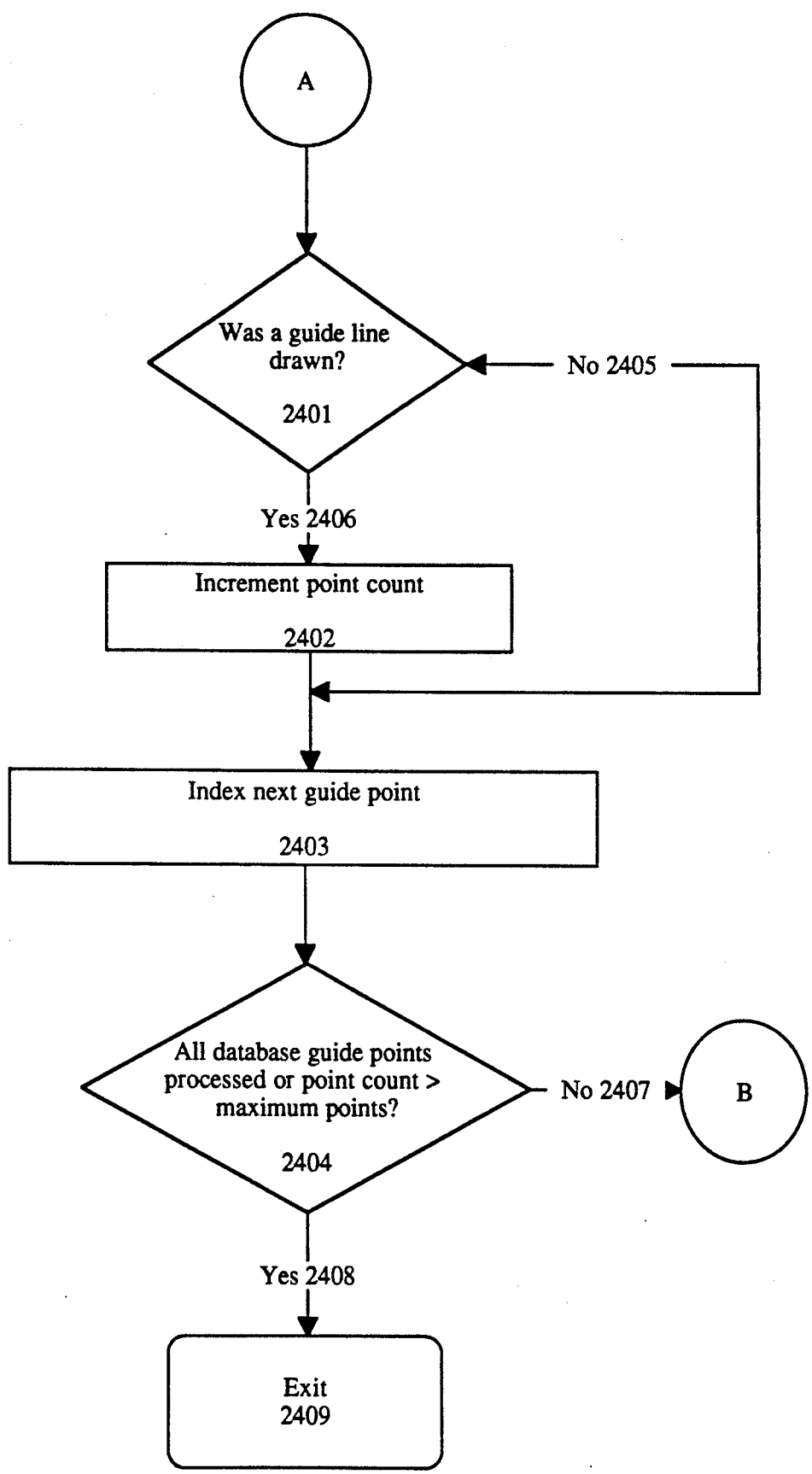

Starting at A in FIG. 25, the guide point data base searching process is set up for another iteration using the next guide point in the data base. This process begins by incrementing the point count (processing box 2402) if either a vertical or horizontal guide line was drawn for the current guide point (decision box 2401). If a guide line was not drawn (processing path 2405), control drops to processing box 2403. If a guide line was drawn for the current guide point (processing path 2406), the point counter is incremented (processing box 2402). The next guide point in the guide point data base is indexed (processing box 2403). If all guide point data base guide points have been processed or if the point count has exceeded the maximum number of guide points specified in the graphic guide configuration menu 230 (decision box 2404), control terminates normally (processing path 2408) through termination box 2409. If all data base guide points have not been processed (processing path 2407), control returns to connector symbol B in FIG. 23 and processing continues, as described earlier, for the next guide point.

Figure 26:
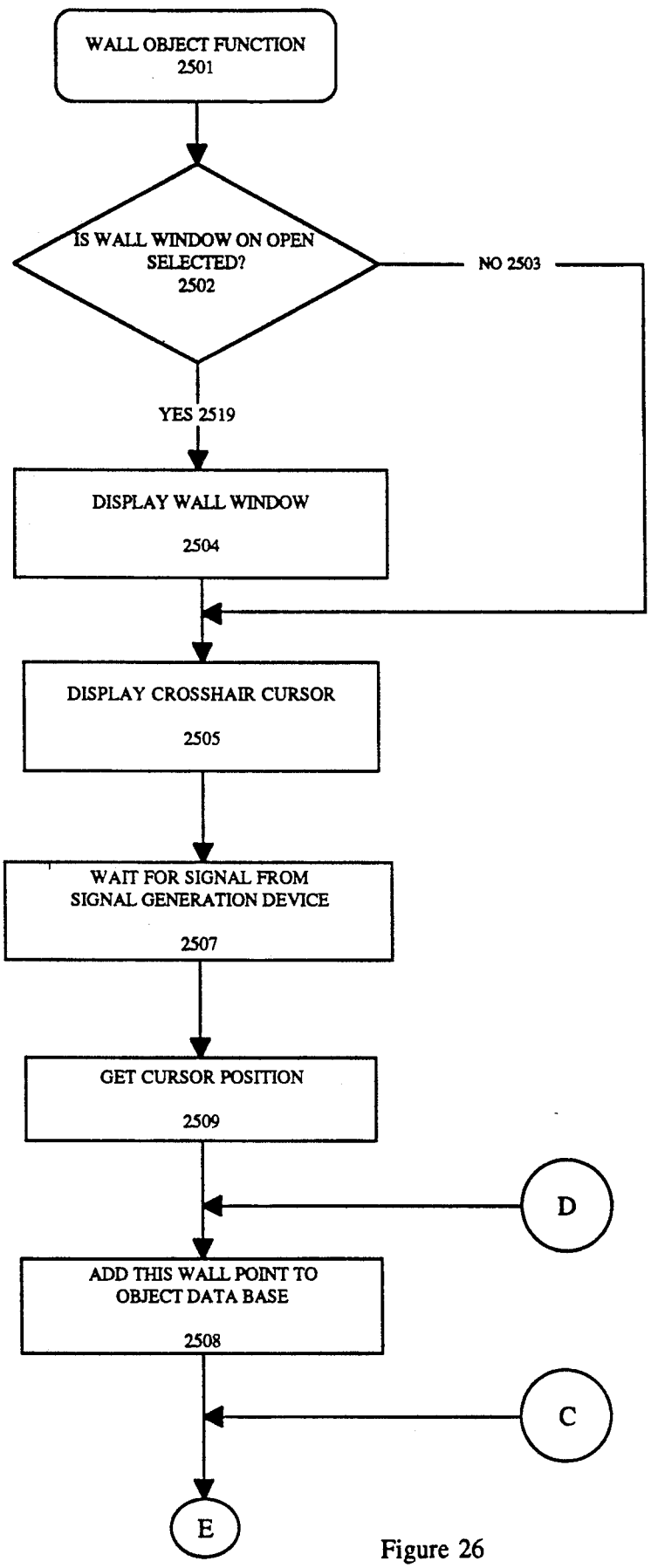

Referring now to FIG. 26, the processing logic associated with the drawing and manipulating of wall objects is described. The processing logic described herein is activated by the operating system when the wall tool is selected as described above. Once the wall tool is selected, the processing flow begins, as shown in FIG. 26 at the processing box labeled "Wall Object Function" 2501. On initial activation, a test is performed (decision box 2502) to determine if the wall configuration window 302 should be displayed on initial activation of the wall tool. If this is the case (processing path 2519), the wall configuration window 302 is displayed (processing box 2504). If activation of the wall tool with the wall configuration is not desired (processing path 2503), control drops to processing box 2505 where a cross hair cursor is displayed at the current position of the cursor on the display screen. Next, processing is suspended (processing box 2507) until a signal is received from the signal generation device or operating system. Once this signal is received, processing continues to processing box 2509 where the current cursor position is obtained. Next, a wall point (wall segment end point or joint) located at the current cursor position is added to the object data base (processing box 2508).

Figure 27:
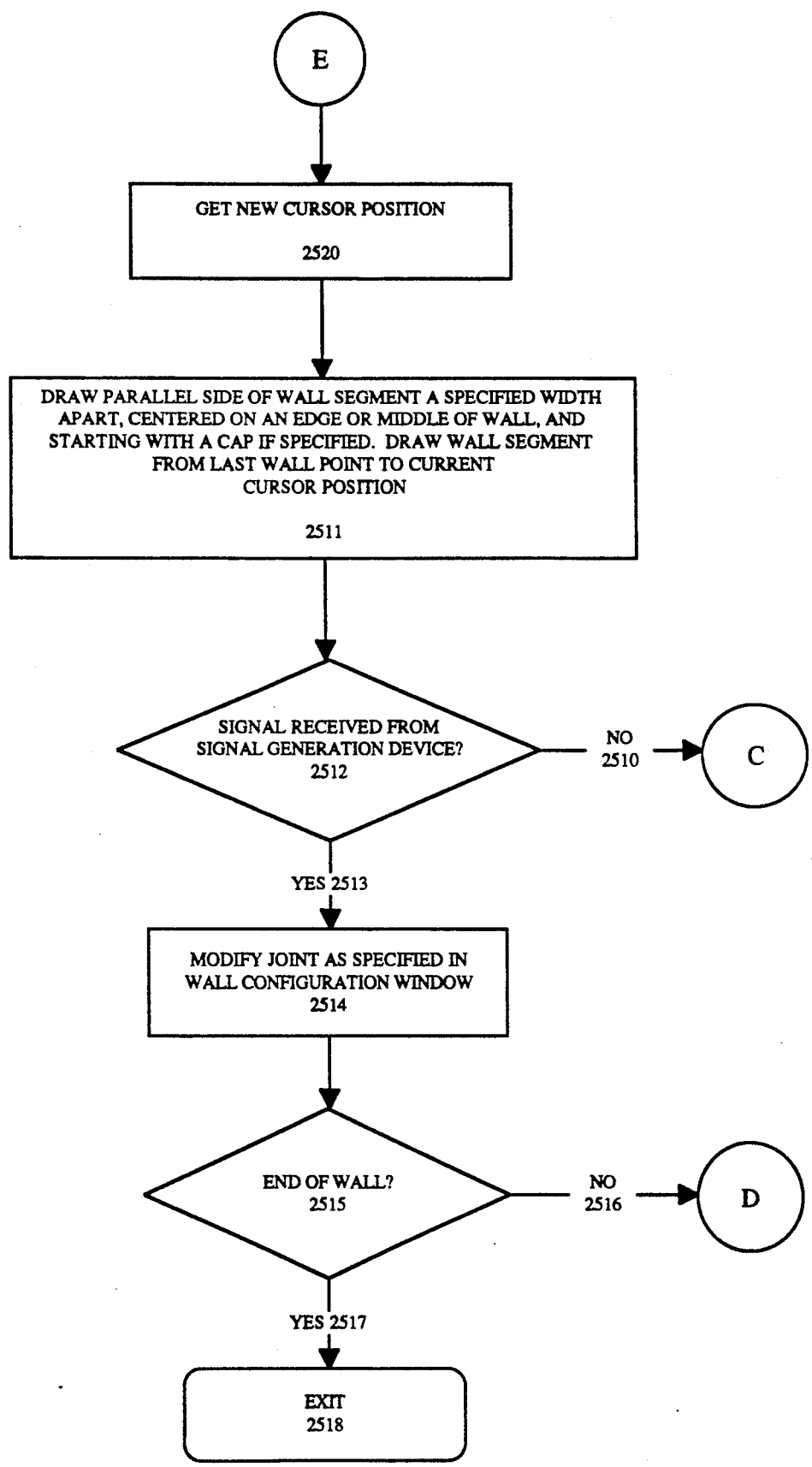

A loop is initiated at connector E in FIG. 27, whereby a wall segment is drawn between the last wall point and the current cursor position. The edges of the wall segment will follow the cursor as it moves around the display screen. Referring to FIG. 27, the current cursor position is obtained in processing box 2520. Control then continues to processing box 2511 where a set of parallel edges of the wall segment are drawn at a specified width apart and centered on an edge or a center of the wall segment, starting initially with a cap, if so specified, in wall configuration window 302. The wall segment is drawn from the last wall point to the current cursor position. Next, a test 2512 is performed to determine if the signal generation device has been activated. If no such activation of the signal generation device has occurred (processing path 2510), control returns to connection symbol "C" where a new cursor position is obtained and the display of the sides of the wall segment is updated for the new cursor position. If a signal is received from the signal generation device (processing path 2513), a wall segment has been completed. In this case, the joint between this wall segment and the next wall segment is created as specified in the wall configuration window (processing box 2514). Next, a test 2515 is performed to determine if processing for the entire wall is complete. In the preferred embodiment a termination signal is transmitted to the processing logic herein by a double activation of the signal generation device in rapid succession. Such a signal is called a double click. If a double click is received (processing path 2517), processing terminates normally at termination box 2518 and processing for this wall object is complete. If no termination signal is received (processing path 2516), processing continues at connection symbol "D" where a loop iterates again for a new wall segment starting at a new wall point. Thus, a means for processing the manipulation and display of wall objects is described.

Figure 28:
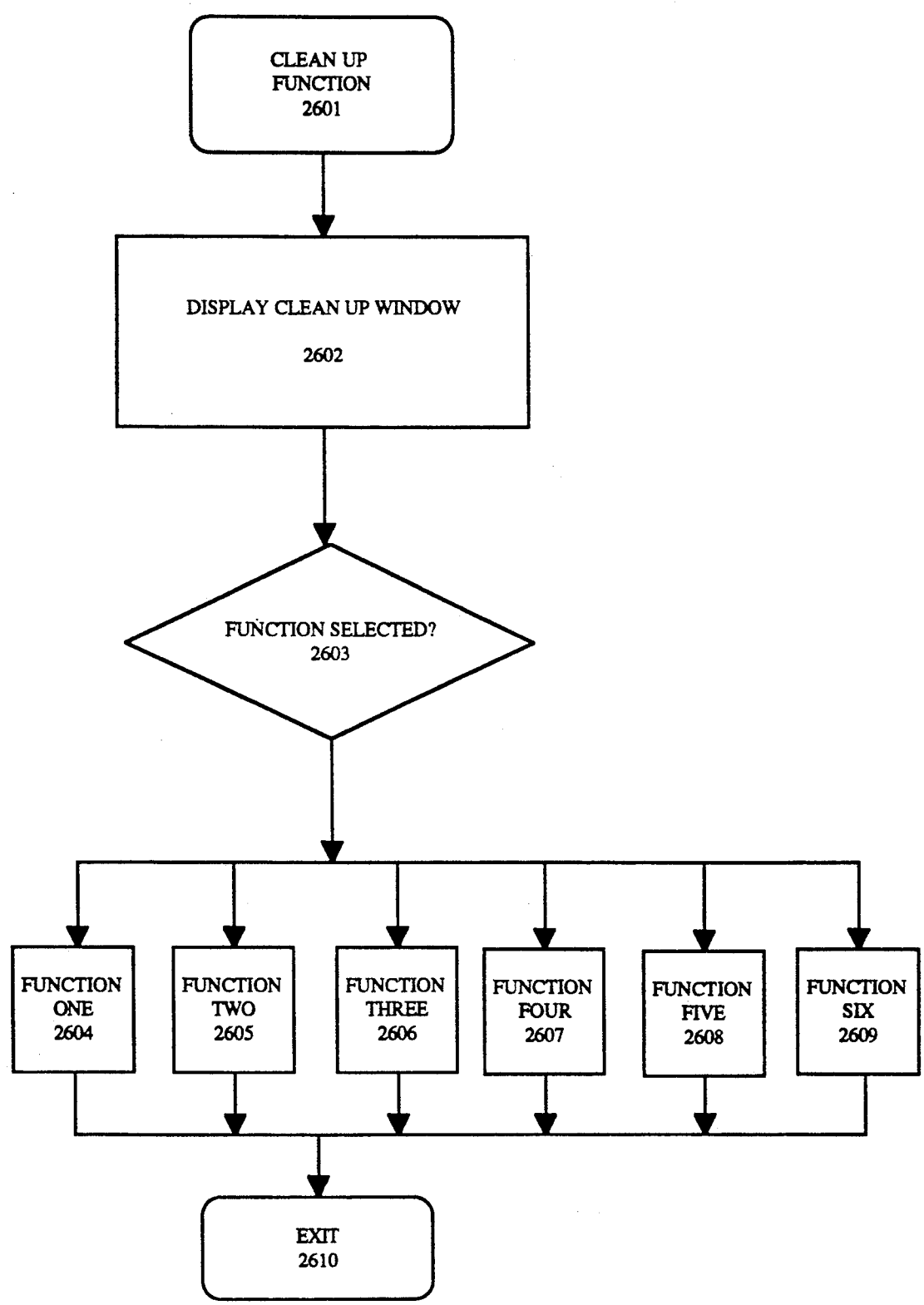
Figure 29:
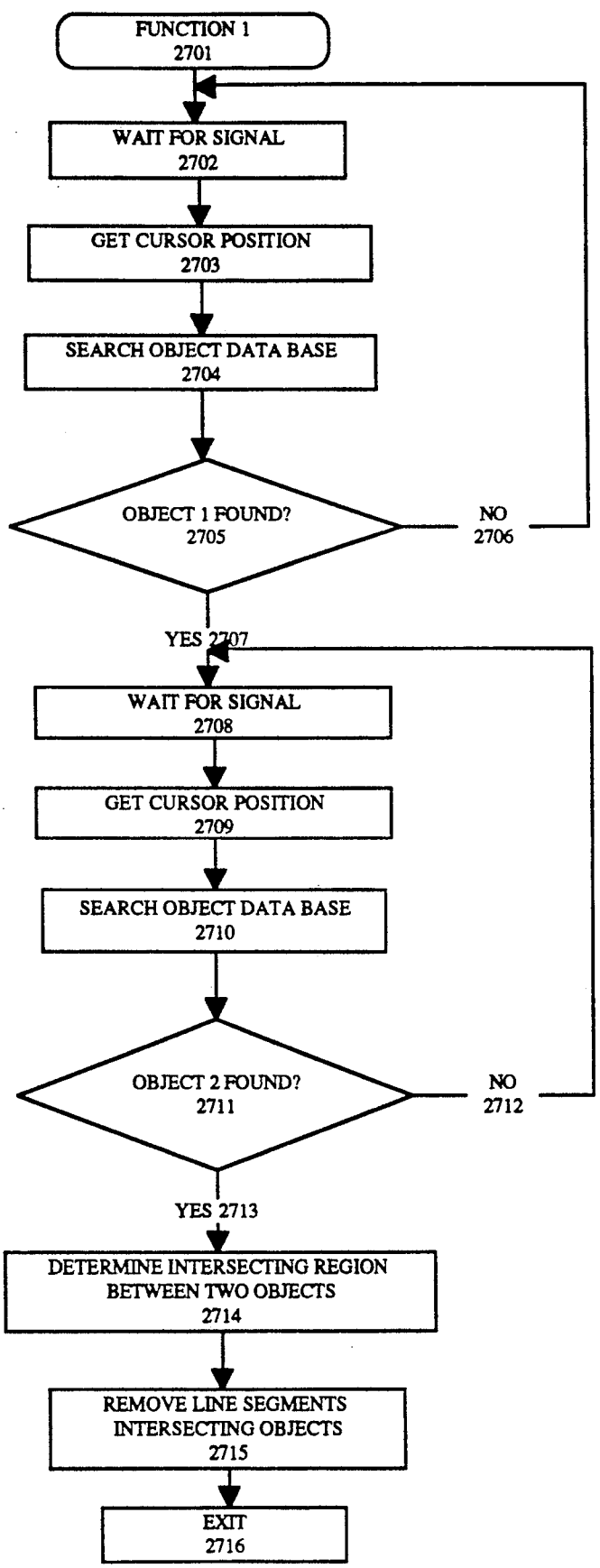
Figure 30:
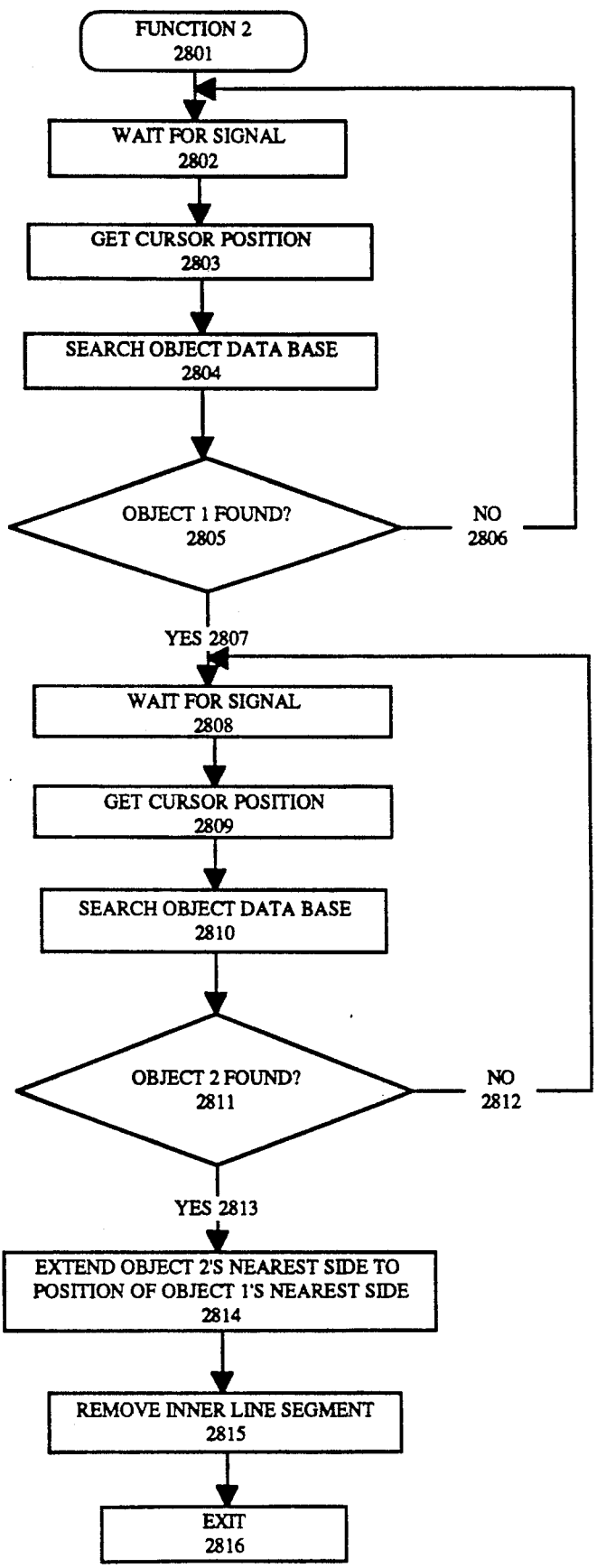

The processing logic associated with the clean up means of the present invention is activated by the operating system when an appropriate menu selection is made from a menu as shown in FIG. 20. As described earlier, other means for activating the clean up means of the present invention are available. Once the clean up means program logic is activated, the processing flow begins as shown in FIG. 28 at the box labeled "Clean Up Function" 2601. The first operation performed (processing box 2602) is the display of the clean up window 410 as shown in FIGS. 20 and 21. As described earlier, clean up window 410 includes six clean up means accessible using clean up window 410, the cursor control device, and the signal generation means. Depending upon the location of cursor 200 at a time when signal generation device is activated, one of the six available clean up means is activated. Referring again to FIG. 28, a test is performed (decision box 2603) to determine which of the available clean up means has been selected. If the first clean up means 411 is selected, the processing logic associated with the first function or Function 1 (processing box 2604) is executed as shown in FIG. 29. Similarly, if clean up means 412 is selected, the processing logic associated with Function 2 (processing box 2605) is executed, as shown in FIG. 30. Similarly, selection of other clean up means causes the activation of the associated processing logic. As the processing associated with a particular function is completed, control passes to a normal termination box 2610 in FIG. 28 and clean up means processing is terminated.

Referring now to FIG. 29, the processing logic associated with the selection of the first clean up means 411 is depicted. On activation of clean up means 411, the processing flow begins at processing box 2701 as shown in FIG. 29. First, processing is suspended (processing box 2702) until a signal is received from the signal generation device or operating system. When this occurs, the current position of the cursor is obtained (processing box 2703) and the object data base is searched for proximately located objects (processing box 2704). If no objects are found (processing path 2706), control returns to processing box 2702, where again processing suspends until a signal is received from the signal generation device or operating system. If a first object is found in the object data base (processing path 2707), the index associated with that first object is retained and processing is again suspended until a signal is received from the signal generation device (processing box 2708). When a second signal is received from the signal generation device, the cursor position is obtained again (processing box 2709) and the object data base is searched again (processing box 2710) for the occurrence of a second object proximately located to the new cursor position. If a second object is not found in the object data base (processing path 2712), control flow is transferred back to processing box 2708 where processing is again suspended pending the receipt of a signal from the signal generation device or operating system. If a second object is found in the object data base (processing path 2713), the boundaries of each object are scanned to determine an intersecting region between the objects found (processing box 2714). Once the boundary of the intersecting region is determined, the object line segments intersecting the boundary of the intersecting region are cleared (processing box 2715). Processing for this clean up means then terminates normally at processing box 2716.

Referring now to FIG. 30, the processing logic associated with the selection of the second clean up means 412 is depicted. On activation of clean up means 412, the processing flow begins at processing box 2801 as shown in FIG. 28. First, processing is suspended (processing box 2802) until a signal is received from the signal generation device or operating system. When this occurs, the current position of the cursor is obtained (processing box 2803) and the object data base is searched for proximately located objects (processing box 2804). If no objects are found (processing path 2806), control returns to processing box 2802, where again processing suspends until a signal is received from the signal generation device or operating system. If a first object is found in the object data base (processing path 2807), the index associated with that first object is retained and processing is again suspended until a signal is received from the signal generation device (processing box 2808). When a second signal is received from the signal generation device, the cursor position is obtained again (processing box 2809) and the object data base is searched again (processing box 2810) for the occurrence of a second object proximately located to the new cursor position. If a second object is not found in the object data base (processing path 2812), control flow is transferred back to processing box 2808 where processing is again suspended pending the receipt of a signal from the signal generation device or operating system. If a second object is found in the object data base (processing path 2813), the edge of object 2 nearest to the position of an edge of object 1 is extended to meet the nearest edge of object 1. If object 2 is a line segment, the end point of the line segment is extended to meet the edge or line segment of object 1 (processing box 2814). If object 2 is a wall or polygon object, the inner edge intersecting object 1 is removed (processing box 2815). Control then terminates normally at processing box 2816.

Figure 31:
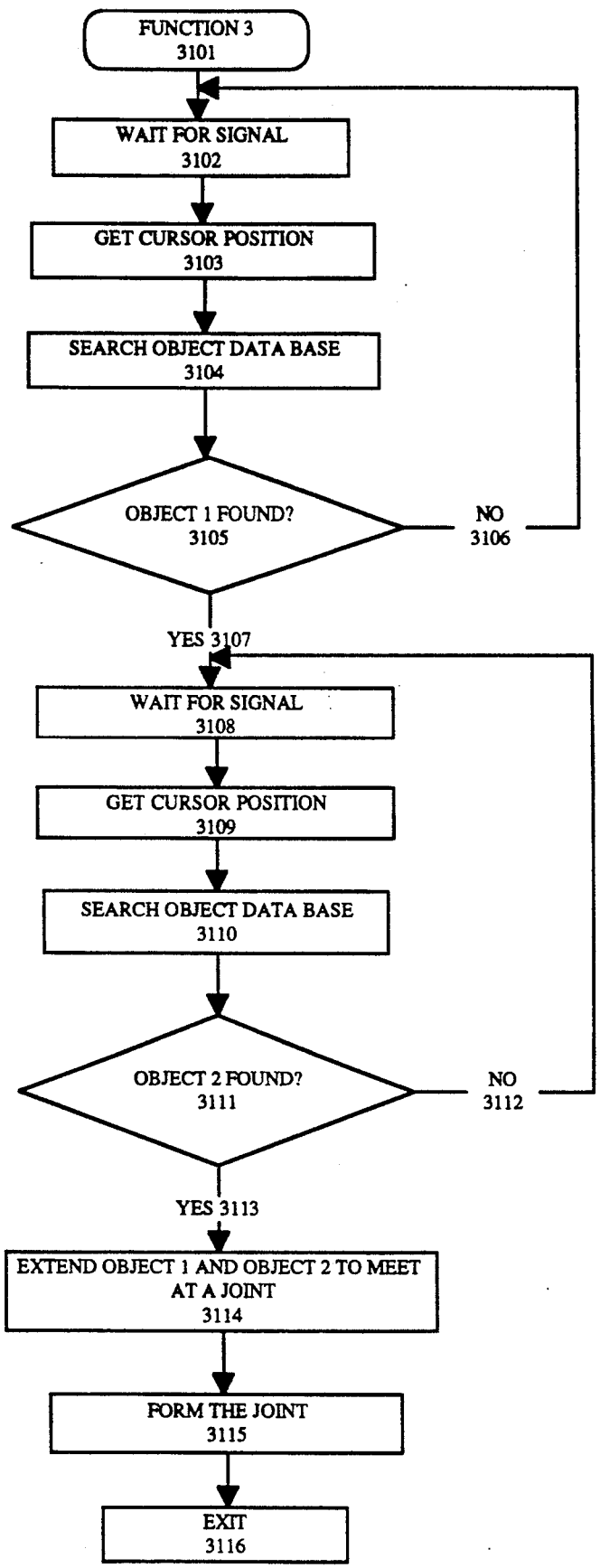

Referring now to FIG. 31, the processing logic associated with the selection of the third clean up means 413 is depicted. On activation of clean up means 413, the processing flow begins at processing box 3101 as shown in FIG. 31. First, processing is suspended (processing box 3102) until a signal is received from the signal generation device or operating system. When this occurs, the current position of the cursor is obtained (processing box 3103) and the object data base is searched for proximately located objects (processing box 3104). If no objects are found (processing path 3106), control returns to processing box 3102, where again processing suspends until a signal is received from the signal generation device or operating system. If a first object is found in the object data base (processing path 3107), the index associated with that first object is retained and processing is again suspended until a signal is received from the signal generation device (processing box 3108). When a second signal is received from the signal generation device, the cursor position is obtained again (processing box 3109) and the object data base is searched again (processing box 3110) for the occurrence of a second object proximately located to the new cursor position. If a second object is not found in the object data base (processing path 3112), control flow is transferred back to processing box 3108 where processing is again suspended pending the receipt of a signal from the signal generation device or operating system. If a second object is found in the object data base (processing path 3113), the edge of object 2 nearest to the extended position of an edge of object 1 is extended to meet the extended edge of object 1. If object 2 is a line segment, the end point of the line segment is extended to meet the extended edge or line segment of object 1 (processing box 2814). If object 2 is a wall or polygon object, the joint between extended object 1 and extended object 2 is formed by connecting one of edge of object 1 and one edge of object 2 to a common point, while the opposite edge of object 1 and object 2 are connected to a common point (processing box 2815). Processing for this clean up means then terminates normally at processing box 3116.

Figure 32:
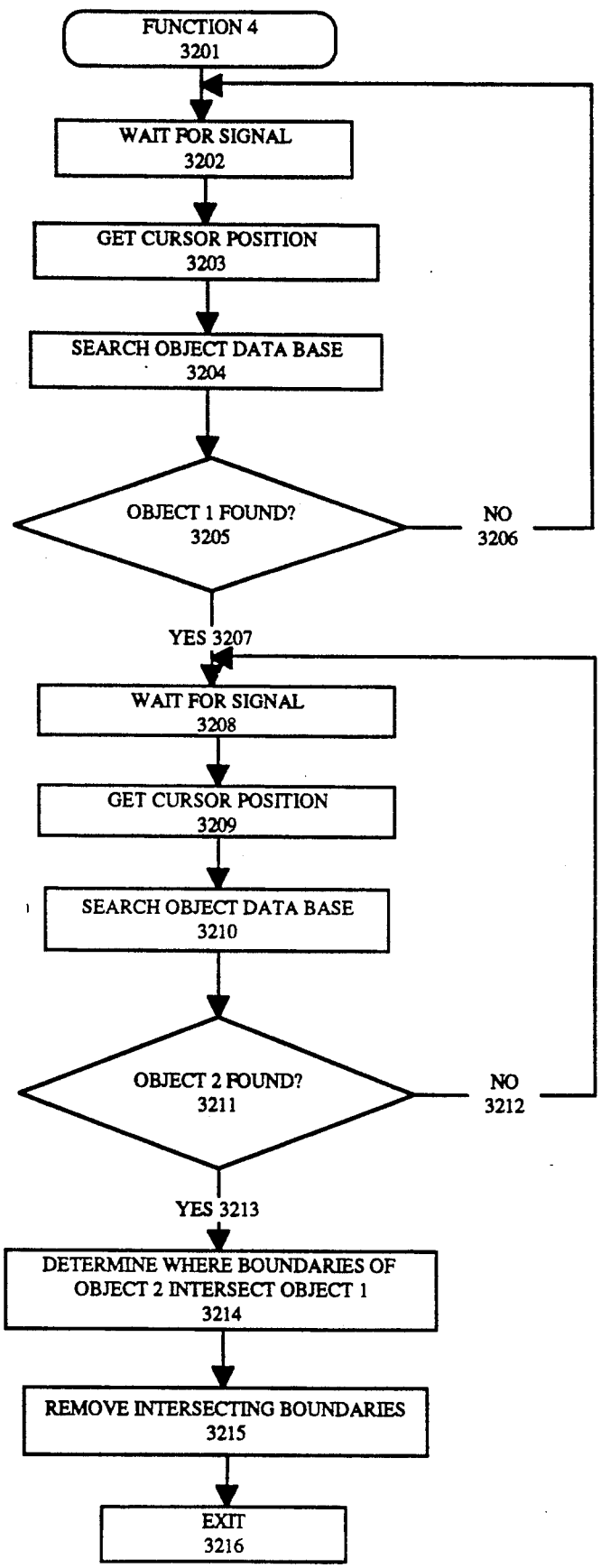

Referring now to FIG. 32, the processing logic associated with the selection of the fourth clean up means 414 is depicted. On activation of clean up means 414, the processing flow begins at processing box 3201 as shown in FIG. 32. First, processing is suspended (processing box 3202) until a signal is received from the signal generation device or operating system. When this occurs, the current position of the cursor is obtained (processing box 3203) and the object data base is searched for proximately located objects (processing box 3204). If no objects are found (processing path 3206), control returns to processing box 3202, where again processing suspends until a signal is received from the signal generation device or operating system. If a first object is found in the object data base (processing path 3207), the index associated with that first object is retained and processing is again suspended until a signal is received from the signal generation device (processing box 3208). When a second signal is received from the signal generation device, the cursor position is obtained again (processing box 3209) and the object data base is searched again (processing box 3210) for the occurrence of a second object proximately located to the new cursor position. If a second object is not found in the object data base (processing path 3212), control flow is transferred back to processing box 3208 where processing is again suspended pending the receipt of a signal from the signal generation device or operating system. If a second object is found in the object data base (processing path 3213), the boundaries of the second object are scanned for intersection with the first object (processing box 3214). Once the boundary of the intersecting region is determined, the object line segments of object 2 intersecting object 1 are cleared (processing box 3215). Processing for this clean up means then terminates normally at processing box 3216.

Figure 33:
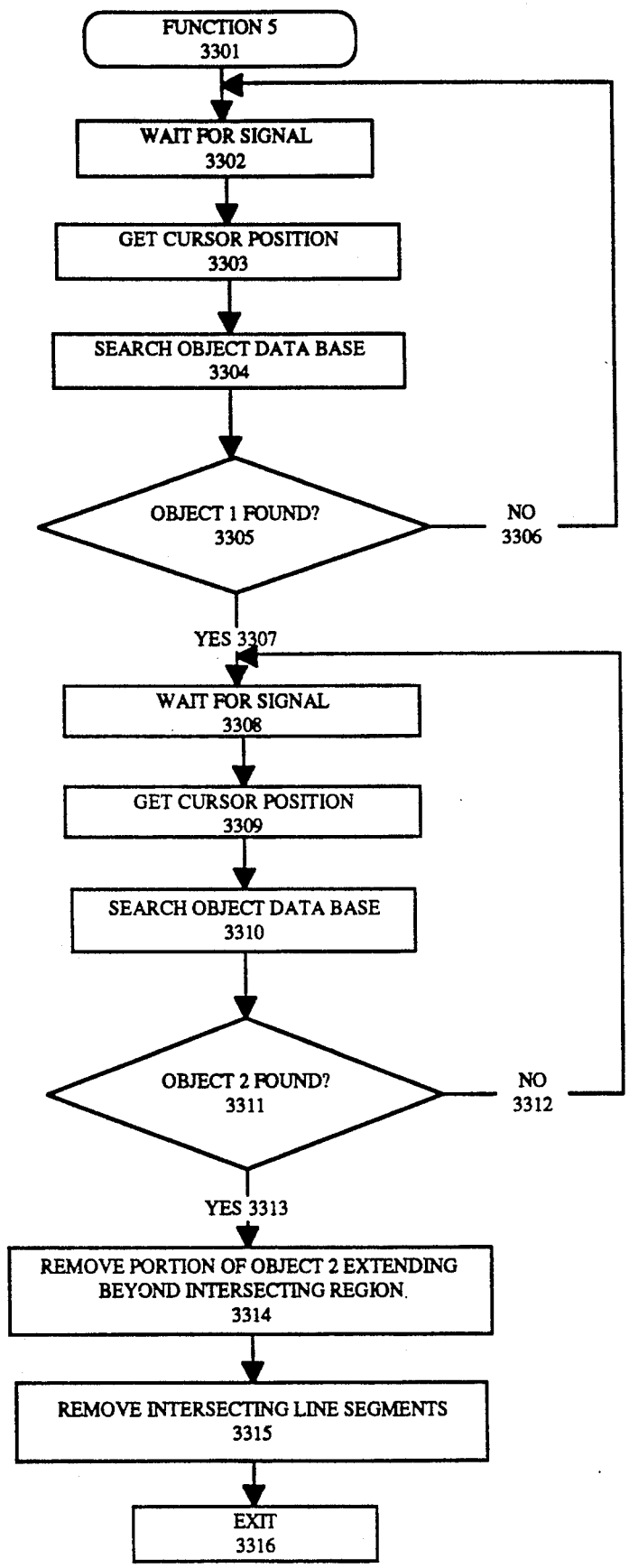

Referring now to FIG. 33, the processing logic associated with the selection of the fifth clean up means 415 is depicted. On activation of clean up means 415, the processing flow begins at processing box 3301 as shown in FIG. 33. First, processing is suspended (processing box 3302) until a signal is received from the signal generation device or operating system. When this occurs, the current position of the cursor is obtained (processing box 3303) and the object data base is searched for proximately located objects (processing box 3304). If no objects are found (processing path 3306), control returns to processing box 3302, where again processing suspends until a signal is received from the signal generation device or operating system. If a first object is found in the object data base (processing path 3307), the index associated with that first object is retained and processing is again suspended until a signal is received from the signal generation device (processing box 3308). When a second signal is received from the signal generation device, the cursor position is obtained again (processing box 3309) and the object data base is searched again (processing box 3310) for the occurrence of a second object proximately located to the new cursor position. If a second object is not found in the object data base (processing path 3312), control flow is transferred back to processing box 3308 where processing is again suspended pending the receipt of a signal from the signal generation device or operating system. If a second object is found in the object data base (processing path 3313), the boundaries of each object are scanned to determine an intersecting region between the objects found. A portion of object 2 is removed where it extends beyond the intersecting region (processing box 3314). Once the boundary of the intersecting region is determined, the object 2 line segments intersecting object 1 are cleared (processing box 3315). Processing for this clean up means then terminates normally at processing box 3316.

Figure 34:
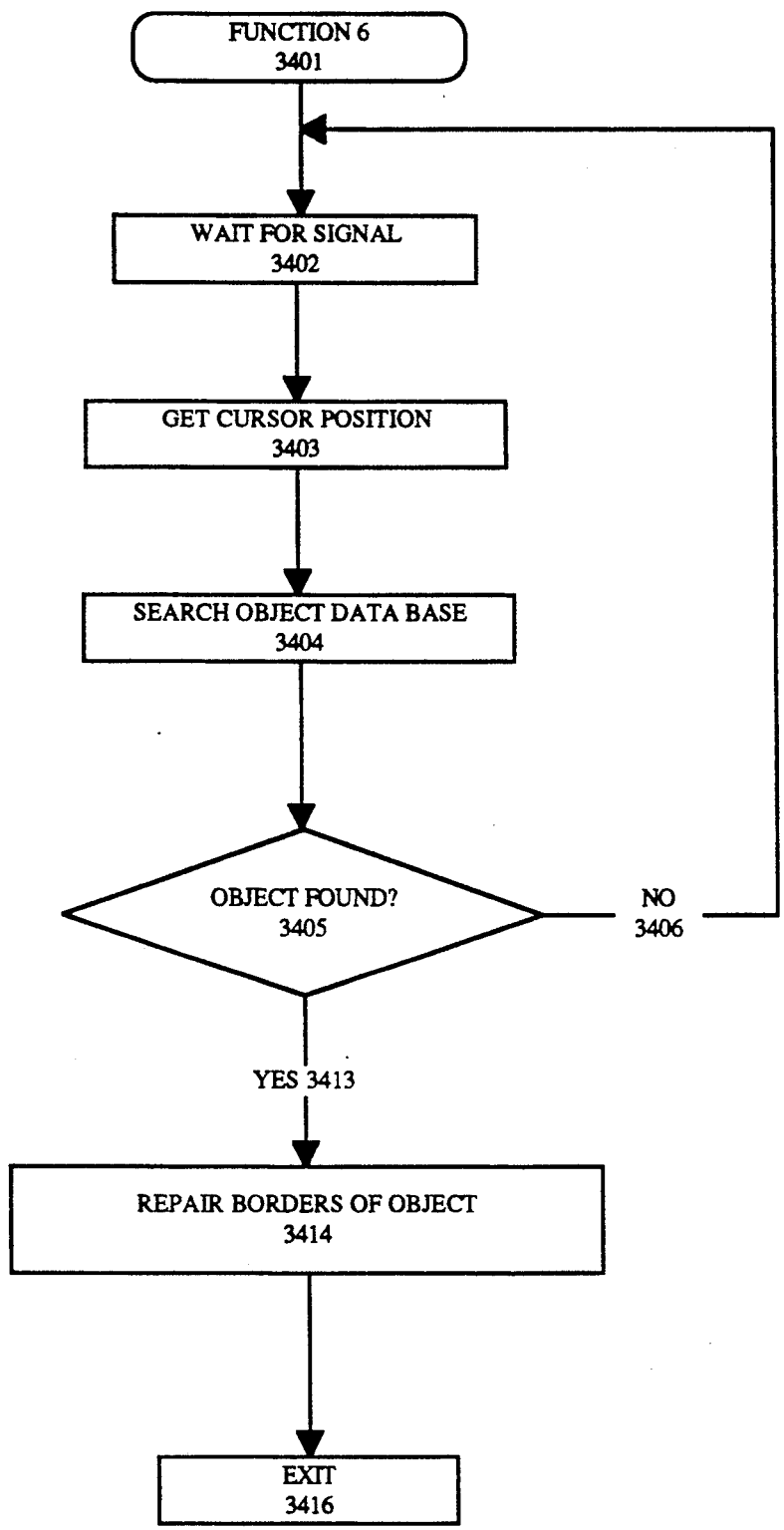

Referring now to FIG. 34, the processing logic associated with the selection of the sixth clean up means 416 is depicted. On activation of clean up means 416, the processing flow begins at processing box 3401 as shown in FIG. 34. First, processing is suspended (processing box 3402) until a signal is received from the signal generation device or operating system. When this occurs, the current position of the cursor is obtained (processing box 3403) and the object data base is searched for proximately located objects (processing box 3404). If no objects are found (processing path 3406), control returns to processing box 3402, where again processing suspends until a signal is received from the signal generation device or operating system. If an object is found in the object data base (processing path 3413), the boundaries of the object are redrawn to repair breaks in the continuity of the boundary (processing box 3414). Processing for this clean up means then terminates normally at processing box 3416.

Although this invention has been shown in relation to a particular embodiment, it should not be considered so limited. Rather, it is limited only by the appended claims.

What is claimed is:

1. In an interactive computer-controlled display system having a processor, a memory means, a display screen coupled to said processor, and a cursor control device coupled to said processor for interactively positioning a cursor on said display screen, wherein a graphic object is displayed on said display screen, a process for generating and manipulating a graphic guide on said display screen comprising the steps of:

maintaining a guide point database comprising information related to a plurality of guide points for said graphic object, said information including the location of each said guide point on said display screen;

comparing the position of said cursor with said location of each said guide point;

displaying a guide line on said display screen if a guide point of said plurality of guide points is located within a predetermined distance of said cursor.

2. The process in claim 1 including a step of highlighting said guide point with which a guide line is displayed.

3. The process in claim 1 wherein said guide line is displayed in said displaying step while said cursor is located within a proximity region associated with said guide point, said proximity region being defined by a predetermined distance from said guide point.

4. The process in claim 1 wherein said guide line is displayed as a horizontal dashed line extending the entire horizontal dimension of a window in which said guide line is displayed.

5. The process in claim 1 wherein said guide line is displayed as a vertical dashed line extending the entire vertical dimension of a window in which said guide line is displayed.

6. The process in claim 1 including a step of configuring said graphic guide using a configuration menu comprising a plurality of configuration parameters.

7. The process in claim 1 wherein said guide line is displayed only if a previously set configuration parameter is set to enable the display of said guide line.

8. The process in claim 1 wherein said guide line is displayed only if the speed of movement of said cursor is less than a previously set configuration parameter.

9. The process in claim 1 wherein said guide line is displayed only if said cursor is located within a proximity region associated with a number of guide points, said number being less than a maximum number of guide points previously set in a configuration parameter, said proximity region being defined by a predetermined distance from said guide point.

10. The process in claim 1 wherein said guide line is displayed only if said cursor is located within a distance from said guide point, said distance previously set in a configuration parameter.

11. The process in claim 1 wherein said guide line intersects said guide point.

12. In an interactive computer-controlled display system having a processor, a memory means, a display screen coupled to said processor, a cursor control device coupled to said processor for interactively positioning a cursor on said display screen, and a signal generation device, a process for generating and manipulating a wall object on said display screen comprising the steps of:

configuring the generation of said wall object by selecting and setting a plurality of configuration parameters;

receiving a wall point;

drawing a portion of said wall object on said display screen, said portion of said wall object comprising a first line and a second line each drawn between said wall point and the position of said cursor, said first line and said second line being parallel to each other and separated by a previously configured distance;

repeating said receiving step and said drawing step until a termination signal is received from said signal generation device after said signal generation device is activated by a user;

modifying said wall object as specified by said configuration parameters.

13. The process in claim 12 wherein said portion of said wall object is drawn in said drawing step as a pair of parallel dashed lines.

14. The process in claim 12 including a step of displaying a wall configuration window, said configuration parameters displayed and manipulated within said wall configuration window.

15. The process in claim 12 wherein the width of said portion of said wall object is set in said configuring step, said width being the distance separating said first line and said second line.

16. The process in claim 12 wherein the length of said portion of said wall object is referenced from the center of said portion of said wall object.

17. The process in claim 12 wherein the length of said portion of said wall object is referenced from an edge of said portion of said wall object.

18. The process in claim 12 wherein said wall object is modified in said modifying step by drawing an end cap at each end of said wall object if the drawing of said end cap has been selected in said configuring step.

19. The process in claim 12 wherein said modifying step includes modifying each joint between two said portions of said wall object as specified by a configuration parameter set in said configuring step.

20. The process in claim 19 wherein each said joint is modified by connecting the first lines of two said portions of said wall object to a common first point and connecting the second lines of two said portions of said wall object to a common second point.

21. The process in claim 20 wherein a diagonal line is drawn between said first point and said second point associated with each said joint.

22. In an interactive computer-controlled display system having a processor, a memory means, a display screen coupled to said processor, and a cursor control device coupled to said processor for interactively positioning a cursor on said display screen, wherein a graphic object is displayed on said display screen, an apparatus for generating and manipulating a graphic guide on said display screen comprising:

means for maintaining a guide point database comprising information related to a plurality of guide points for said graphic object, said information including the location of each said guide point on said display screen;

means for comparing the position of said cursor with said location of each said guide point;

means for displaying a guide line on said display screen if a guide point of said plurality of guide points is located within a predetermined distance of said cursor.

23. In an interactive computer-controlled display system having a processor, a memory means, a display screen coupled to said processor, a cursor control device coupled to said processor for interactively positioning a cursor on said display screen, and a signal generation device, an apparatus for generating and manipulating a wall object on said display screen comprising: means for configuring the generation of said wall object by selecting and setting a plurality of configuration parameters;

means for receiving a wall point;

means for drawing a portion of said wall object on said display screen, said portion of said wall object comprising a first line and a second line each drawn between said wall point and the position of said cursor, said first line and said second line being parallel to each other and separated by a previously configured distance;

means for repeating said receiving step and said drawing step until a termination signal is received from said signal generation device after said signal generation device is activated by a user;

means for modifying said wall object as specified by said configuration parameters.

24. A process for generating and manipulating a graphic guide on a display screen, said process comprising the steps of:

maintaining a guide point database comprising information related to a plurality of guide points for a graphic object, said information including the location of each said guide point on said display screen;

comparing the position of a cursor with said location of each said guide point;

displaying a guide line on said display screen if a guide point of said plurality of guide points is located within a predetermined distance of said cursor.

25. A process for generating and manipulating a wall object on a display screen, said process comprising the steps of:

configuring the generation of said wall object by selecting and setting a plurality of configuration parameters;

receiving a wall point;

drawing a portion of said wall object on said display screen, said portion of said wall object comprising a first line and a second line each drawn between said wall point and the position of a cursor, said first line and said second line being parallel to each other and separated by a previously configured distance;

repeating said receiving step and said drawing step until a termination signal is received from a signal generation device after said signal generation device is activated by a user;

modifying said wall object as specified by said configuration parameters.

* * * * *